United States Patent
Ishii et al.

(10) Patent No.: US 7,426,609 B2
(45) Date of Patent: Sep. 16, 2008

(54) DISK CONTROL APPARATUS, DISK CONTROL METHOD, REMOTE DISK CONTROL APPARATUS, AND REMOTE DISK CONTROL METHOD

(75) Inventors: Atsushi Ishii, Kawasaki (JP); Hideo Takahashi, Kawasaki (JP); Tatsuya Yanagisawa, Kawaswaki (JP); Hidefumi Kobayashi, Kawasaki (JP); Hideo Masuda, Kawasaki (JP); Rei Hirose, Kawasaki (JP); Daisuke Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/365,986

(22) Filed: Feb. 13, 2003

(65) Prior Publication Data

US 2003/0131163 A1 Jul. 10, 2003

Related U.S. Application Data

(63) Continuation of application No. PCT/JP00/05572, filed on Aug. 18, 2000.

(51) Int. Cl.
 *G06F 12/00* (2006.01)
(52) U.S. Cl. ....................... 711/112; 711/113
(58) Field of Classification Search .......... 711/112–113
 See application file for complete search history.

(56) References Cited

U.S. PATENT DOCUMENTS 5,455,926 A * 10/1995 Keele et al. ............... 711/4
5,528,755 A * 6/1996 Beardsley et al. .......... 714/48
5,802,028 A * 9/1998 Igarashi ................ 369/53.24
6,009,498 A * 12/1999 Kumasawa et al. ........ 711/113
6,487,632 B1 * 11/2002 Nakatani ................... 711/112
6,715,030 B1 * 3/2004 Vandenbergh et al. ..... 711/111

FOREIGN PATENT DOCUMENTS

| JP | 61-040635 | | 2/1986 |
| JP | 62-139183 | | 6/1987 |
| JP | 08-147110 | | 6/1996 |
| JP | 8-221210 | | 8/1996 |
| JP | 08-221210 | * | 8/1996 |
| JP | 9-274775 | | 10/1997 |
| JP | 11-143646 | | 5/1999 |
| JP | 11-327802 | | 11/1999 |

OTHER PUBLICATIONS

"Count-Key-Data Disks" e-mail from Dick Wilmot, Jun. 24, 1994, pp. 1-2. URL: http://alumnus.caltech.edu/~rdv/comp-arch-storage/ckd-disks.html.*

* cited by examiner

*Primary Examiner*—Matt Kim
*Assistant Examiner*—Shane M. Thomas
(74) *Attorney, Agent, or Firm*—Greer, Burns & Crain, Ltd.

(57) ABSTRACT

A disk control apparatus formats each track of a storage disk device in a short time. The disk control apparatus (1) has a cache memory (14) which stores a part of data, a management table (20) which indicates whether a track of the storage disk device (2) has been initialized to a predetermined track format, and control units (10, 12) which create the track format referring to the management table (20) when an input/output request is received from the host (3). The factory shipment format flag of this management table is set to "1" when factory formatting is executed, and the table is transferred to the disk. By this method, high-speed factory formatting is possible.

10 Claims, 25 Drawing Sheets

DRIVE NUMBER #N

FIG. 19

RA HEADER 60

| addr | | | | |
|---|---|---|---|---|
| x00 | OPERATION CODE | | | ⎫ X |
| x04 | CCCC | HH | DVS | |
| x08 | MODE Flag | | | ⎭ |
| x14 | START CCCC | START HH | DVS | Track A |
| x18 | END CCCC | END HH | | |
| x1C | START CCCC | START HH | DVS | Track B |
| x20 | END CCCC | END HH | | |
| x24 | START CCCC | START HH | DVS | Track C |
| x28 | END CCCC | END HH | | |
| x2C | START CCCC | START HH | DVS | Track D |
| x30 | END CCCC | END HH | | |
| x34 | START CCCC | START HH | DVS | Track E |
| x38 | END CCCC | END HH | | |
| x3C | START CCCC | START HH | DVS | Track F |
| x40 | END CCCC | END HH | | |
| x44 | START CCCC | START HH | DVS | Track G |
| x48 | END CCCC | END HH | | |
| x4C | START CCCC | START HH | DVS | Track H |
| x50 | END CCCC | END HH | | |
| x54 ⋮ xFF | Reserve | | | |

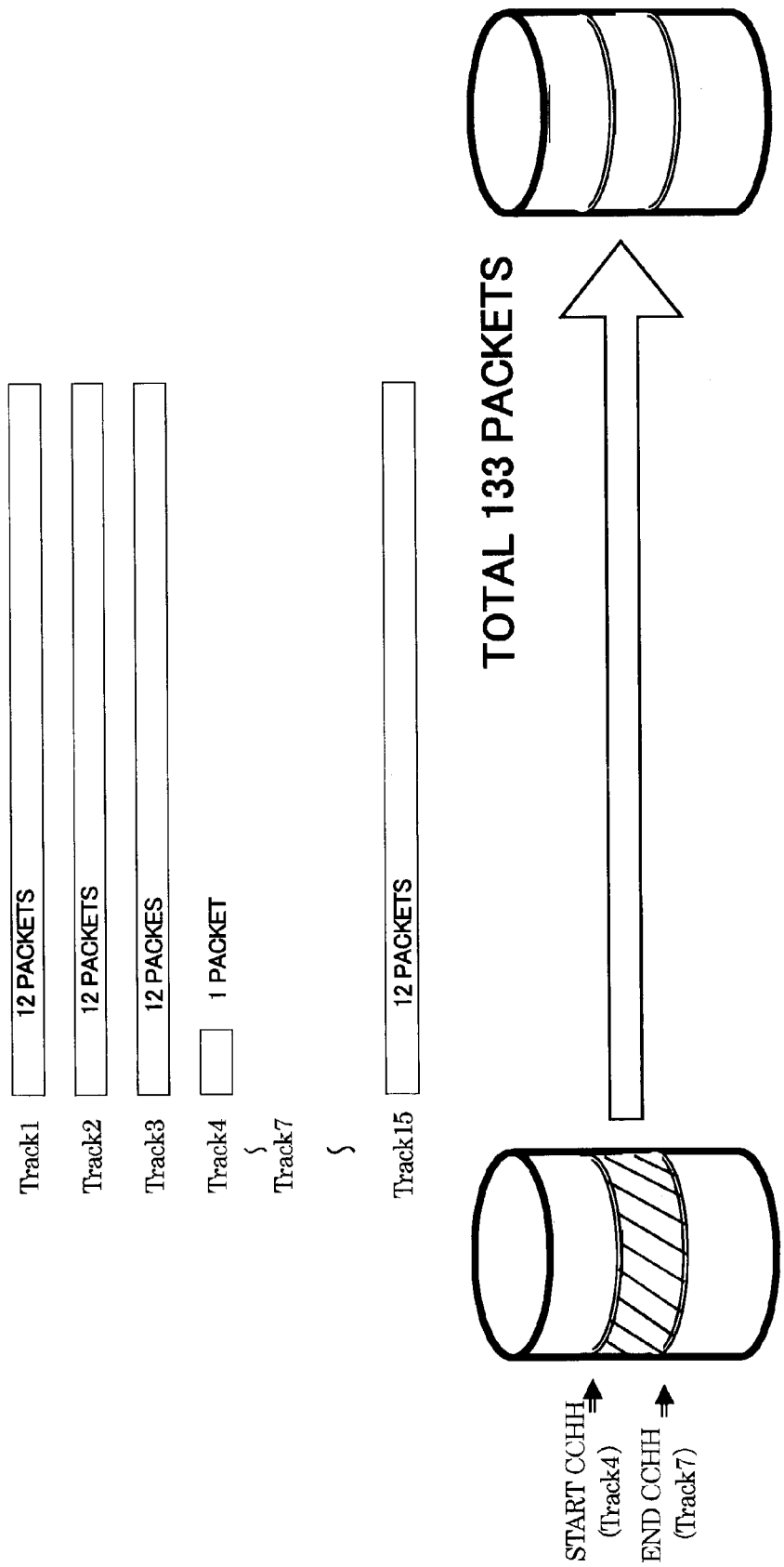

FIG. 25

MEMORANDUM TABLE

| | | | | |
|---|---|---|---|---|
| x00 | START CCCC | START HH | DVS | Track A |
| x04 | END CCCC | END HH | | |
| x08 | START CCCC | START HH | DVS | Track B |
| x0C | END CCCC | END HH | | |
| x10 | START CCCC | START HH | DVS | Track C |
| x14 | END CCCC | END HH | | |
| x18 | START CCCC | START HH | DVS | Track D |
| x1C | END CCCC | END HH | | |
| x20 | START CCCC | START HH | DVS | Track E |
| x24 | END CCCC | END HH | | |
| x28 | START CCCC | START HH | DVS | Track F |
| x2C | END CCCC | END HH | | |
| x30 | START CCCC | START HH | DVS | Track G |
| x34 | END CCCC | END HH | | |
| x38 | START CCCC | START HH | DVS | Track H |
| x3C | END CCCC | END HH | | |

62

US 7,426,609 B2

DISK CONTROL APPARATUS, DISK CONTROL METHOD, REMOTE DISK CONTROL APPARATUS, AND REMOTE DISK CONTROL METHOD

This is a continuation of International PCT Application No. PCT/JP00/05572, filed Aug. 18, 2000.

TECHNICAL FIELD

The present invention relates to a disk control apparatus, disk control method, remote disk control apparatus, and remote disk control method for controlling a disk drive having a storage disk.

BACKGROUND ART

A disk file system, such as a RAID system, is used as a large volume data storage system of a computer center. FIG. 27 is a diagram depicting a prior art, FIG. 28 is a diagram depicting CKD format, and FIG. 29 is a diagram depicting a magnetic disk.

As FIG. 27 shows, a disk control apparatus (hereafter FCU: File Control Unit) 200 is connected to a host computer 100. A magnetic disk drive 210 is connected to the FCU 200. The RAID system is a system where a plurality of small capacity disks for a compact machine are used instead of an expensive disk for a large machine, and excels in the maintainability and redundancy of data.

The FCU 200 comprises CA (Channel Adapter) 220, CM (Centralized Module) 230, and DA (Device Adapter) 250, which are functional units having an MPU respectively, a magnetic disk drive 210, a memory for storing data to be used for functional control, cache memory 240, and a bus 260 connecting these components.

When an input/output request from the host 100 is received, the FCU 200, where data is held in the connected magnetic disk drive 210, develops data from the magnetic disk drive 210 to the cache memory 240 (staging operation), and executes all the input/output processing via the cache memory 240. However, if the target data is already on the cache memory 240 (cache hit) when the input/output request is received from the host 100, the FCU 200 reads/writes data on the cache memory 240, and notifies the end of processing to the host 100.

The FCU 200 is used for basic business (DB (Data Base) processing where data is updated corresponding to accounting and physical distribution) and information business (information search and processing), and is demanded to have higher speed and larger capacity since an exchange of even a larger volume of data is required.

In such a large capacity system, for each track of the magnetic disk drive 210 to be connected to the FCU 200, the CKD track format shown in FIG. 28 is used. As FIG. 29 shows, one disk 280 of the magnetic disk drive 210 has a plurality of concentric tracks. For example, one disk has about 10000 tracks.

All the tracks start with an index mark and end with an index mark. Each track is comprised of an HA (Home Address), an R0 (Record 0), and a user data record Rn (Records R1-Rn).

HA is a first block information of each track, and indicates the status of that track (e.g. normal, defective, replacement) and the physical position of the track. Records R0 and Rn are comprised of a Count Section (8 bytes), Key Section (0-255 bytes), and Data Section (0-47476 bytes). In the Count Section, such data as the length of the Key Section and length of the Data Section are stored. The Key Section and Data Section store the user data. The record R0 is comprised of the Count Section and Data Section, and such data as a replaced track address is stored in the Data Section.

This magnetic disk drive 210 is formatted to be the initial status where no user data exists when the FCU 200 is shipped or when the magnetic disk drive 210 is expanded, and is then used for actual operation. In other words, as FIG. 27 shows, the maintenance terminal (e.g. PC) 300 is connected at the factory or user location, and an initialization instruction is sent from the terminal 300 to the magnetic control apparatus 200. By this initialization instruction, the magnetic disk control apparatus 200 creates only HA and standard R0 (R0 is comprised of an 8 byte Count Section and a Data Section where all 8 bytes are 0) on each track.

Referring to FIG. 27, the conventional initialization (factory) format procedure will be described.

The maintenance terminal (e.g. PC) 300 issues a command to the CM 230, and instructs factory formatting of the magnetic disk drive 210 ([1]). The CM 230 receives the instruction from the maintenance terminal (e.g. PC) 300, schedules the tasks of the factory formatting, and instructs the DA 250 to execute the factory formatting ([2]). The DA 250 receives the instruction from the CM 230, and generates the factory shipment format, which is comprised of HA/standard R0 data patterns, in the internal buffer of the DA 250 ([3]). The DA 250 writes the data patterns generated in [3] to the magnetic disk drive 210 ([4]). Since factory formatting is executed for all the tracks on the magnetic disk drive 210, the DA 250 repeats [3]-[4] for all the tracks on the magnetic disk drive 210, and notifies completion to the CM 230 when completed ([5]). The CM 230 notifies the completion to the maintenance terminal (e.g. PC) 300.

In this way, factory shipment format data is directly written to each track of the magnetic disk drive 210 in a conventional factory formatting, so a large volume of data must be transferred to the magnetic disk drive 210, and formatting takes time. The magnetic disk drive positions the head on each track of the magnetic disk and writes format on each track, so it takes time to write formatting to all the tracks (e.g. 10000 tracks) of one magnetic disk.

For example, if factory formatting is executed for the mainframe type magnetic disk apparatus F6427H (made by Fujitsu), it takes 95 seconds for each drive (one disk drive). Also in a standard RAID system, many disk drives 210 are connected to one FCU 200, so if 64 magnetic disk drives are connected to one FCU 200, for example, then it takes 101 minutes. In the case of a normal user who connects magnetic disks of 64, 128 or 256 disk drives, it takes several hours at the factory or user location, which increases labor cost.

DISCLOSURE OF THE INVENTION

To achieve these objects, a disk control apparatus of the present invention comprises a cache memory which stores a part of data of the storage disk device, a management table which indicates whether a track of the storage disk device has been initialized to a predetermined track format, and a control unit which creates the track format referring to the management table when an input/output request is received from the host.

In the present invention, a track management table is provided in the control apparatus, and a flag to indicate factory shipment formatting is disposed. Factory formatting is implemented by setting a factory shipment format flag of the management table to "1", and transferring only track formatting pattern of this management table to the disk. This method allows high-speed factory formatting.

Also in the present invention, the control unit sets a flag to indicate whether the initialization is completed in the management table according to the instruction from the outside, and initializes the track format of the track of the storage disk device, therefore initialization can be easily executed.

Also in the present invention, when a write request is received from the host, the control unit develops the write data on the cache memory, then writes the write data to the storage disk device along with the track format, therefore an actual format can be created on the disk.

Also in the present invention, when a read request is received from the host, the control unit creates the track format referring to the management table, and responds to the host.

Also in the present invention, a list table for storing a plurality of track format patterns is created, and when an input/output request is received from the host, the control unit creates the track format specified by the list table referring to the management table, which allows factory formatting with the user arbitrary format.

Next, a remote disk control apparatus according to the present invention comprises a cache memory which stores a part of data of the storage disk device, a management table which indicates whether a track of the storage disk device has been initialized to a predetermined track format, a control unit which creates the track format referring to the management table when an input/output request is received from the host, and a remote unit which transfers the initialization information of the management table to a disk control apparatus of a secondary center according to a copy instruction from the host.

Since the remote unit is provided to transfer the initialization information of the management table to the disk control apparatus of the secondary center according to the copy instruction from the host, copy processing at the secondary center can be executed using the factory format information.

In the present invention, the remote unit transfers information on the tracks that have not been initialized so as to decrease the transfer volume.

Also in the present invention, the remote unit transfers a range of the tracks that have not been initialized so as to further decrease the transfer volume.

Also in the present invention, the remote unit creates a track format for tracks that have not been initialized, and transfers the created track format so that the secondary center can execute copy processing without concern for the factory format.

BRIEF DESCRIPTION OF THE DRAWINGS

FIG. 19 is a diagram depicting the transfer packet in FIG. 18;

FIG. 20 is a diagram depicting the remote transfer operation in FIG. 18;

FIG. 25 is a diagram depicting the memorandum table in FIG. 22;

BEST MODE FOR CARRYING OUT THE INVENTION

Embodiments of the present invention will now be described in the sequence of the magnetic disk control system, factory format processing, read/write processing, remote magnetic disk control system, first volume copy processing, second volume copy processing, third volume copy processing, and other embodiments.

Magnetic Disk Control System

Figure 1:
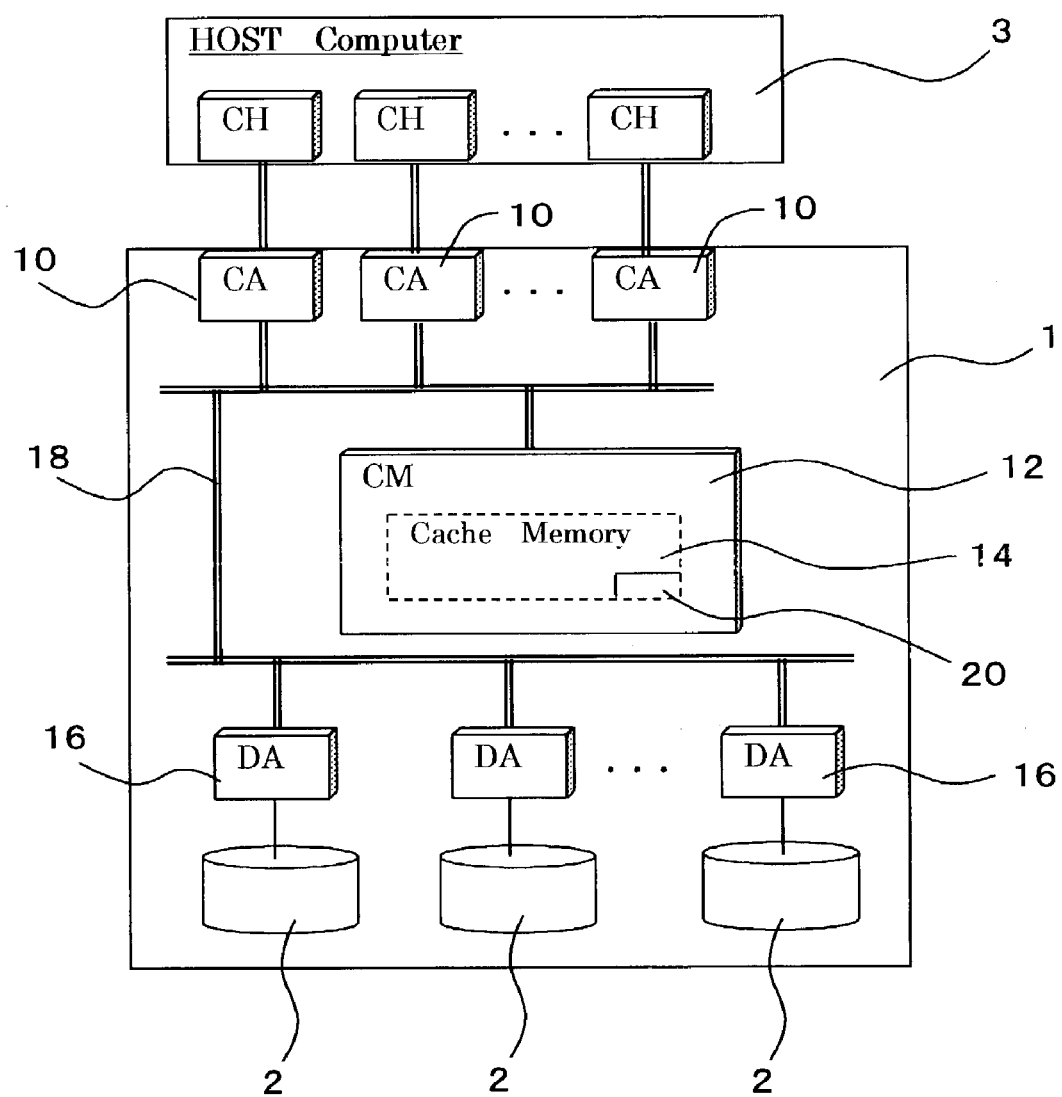
FIG. 1 is a diagram depicting the general configuration of the file control system of an embodiment of the present invention.

FIG. 1 is a diagram depicting the configuration of the disk control system of an embodiment of the present invention, which shows a RAID system using a magnetic disk. As FIG. 1 shows, the magnetic disk control apparatus (hereafter FCU) 1 can quickly and randomly read and write a large volume of data of the computer center (host) 3 from/to the RAID disk drive (hereafter disk) 2.

The FCU 1 is comprised of three functional modules: CA 10, CM 12 and DA 16. These three functional modules have predetermined roles to execute actions in the FCU 1 respectively, so as to decrease the load by not centralizing processing. For the communication interface between modules, a message and ACB are used to transfer processing content and the status of each module.

An outline of the role of each function module 10, 12 and 16 will now be described. The CA (Channel Adapter) 10 is a module which controls the host interface connecting the FCU 1 and HOST 3. When a write/read operation request for the data is received from the HOST 3, the CA 10 notifies the processing request to the CM 12, or directly accesses the cache memory 14 on the CM 12 and transfers data with the HOST 3.

The CM (Centralized Module) 12 performs resource management (manages the resources of each module and execute effective control management), cache memory management (manages the allocation of the memory area and executes general control), and service processing (provides various services using tools for maintenance). The CM 12 encloses the cache memory (several giga byte) 14 for storing the data read from the RAID Disk 2.

The DA (Device Adapter) 16 is a module which controls the apparatus interface between the FCU 1 and the device (magnetic disk) 2, and executes processing for the device 2 according to the instruction from the CM 12.

The RAID (Redundant Arrays of Inexpensive Disks) is a disk system which replaces an expensive disk for a large machine with a plurality of small capacity and inexpensive disks to insure the maintainability and redundancy of the data.

The later mentioned TFT (Track Format Table) 20 is 8 byte information which indicates the status of the format on the disk 2, and this table 20 exists on the cache memory 14 of the CM 12. One TFT exists per track, and TFT stores the number of records existing on the track, data length of the Data Section, and the flags (used for multi-purposes). The CA 10 can recognize the track format by the TFT 20, without checking the actual tracks on the cache 12. The TFT 20 is rewritten by the CA 10 when the track format is changed by a Write I/O from the HOST 3.

Now Factory Format will be described. Conventionally for disks for main frames, CKD logical formatting (only HA/standard R0 are created) is performed at a factory, and are used for actual operation. However this formatting takes time and involves cost since the disks are physically formatted. So to decrease time and cost, CKD logical formatting is performed on the TFT 20 without performing physical formatting. Specifically, a flag called the "Factory Format" is created on the TFT 20, and this flag is set to "1" in the TFT 20 of all the tracks.

Therefore Factory Format is for indicating the CKD logical format before shipment at a factory, but effective data does not exist on an actual disk 2. When an I/O for this track is received from the HOST 3, the CA 10 must operate as if HA/standard R0 actually exists on the disk 2.

Factory Format Processing

Figure 2:
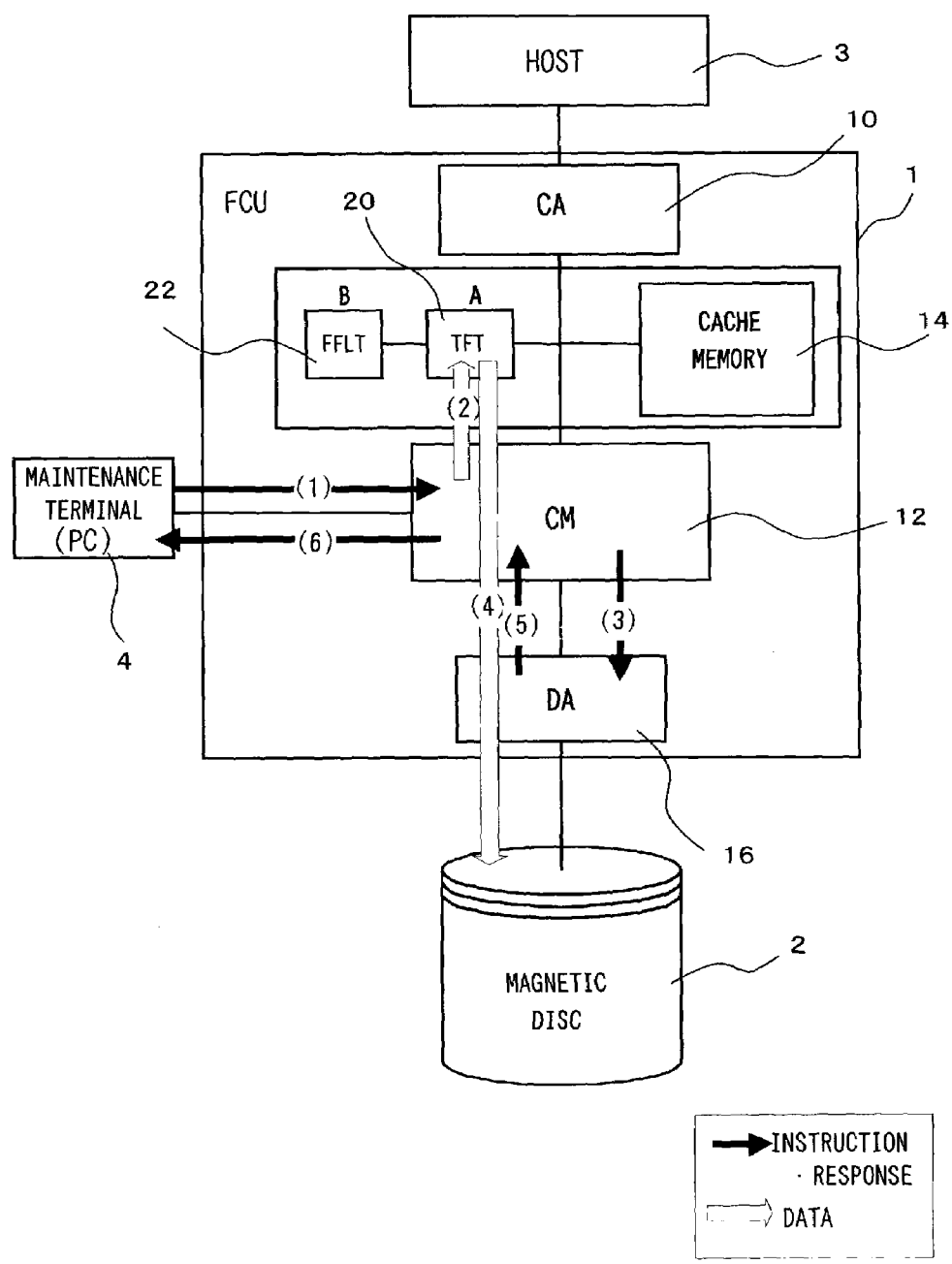
FIG. 2 is a diagram depicting the format processing of an embodiment of the present invention.
Figure 3:
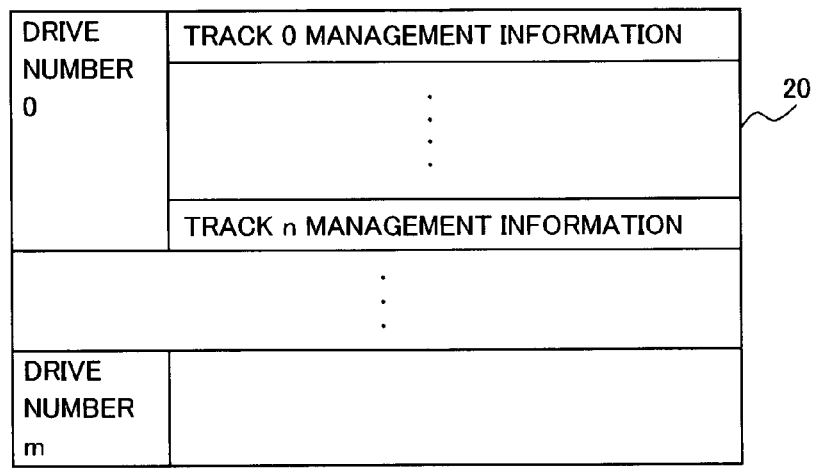
FIG. 3 is a diagram depicting the configuration of the track management table in FIG. 2.
Figure 4:
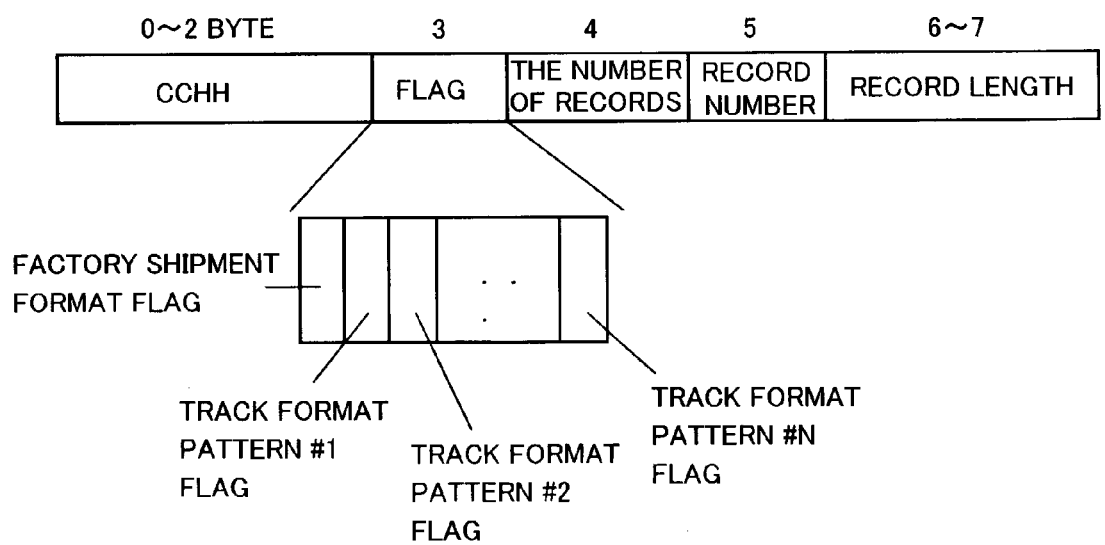
FIG. 4 is a diagram depicting the format of the track management table in FIG. 3.
Figure 5:
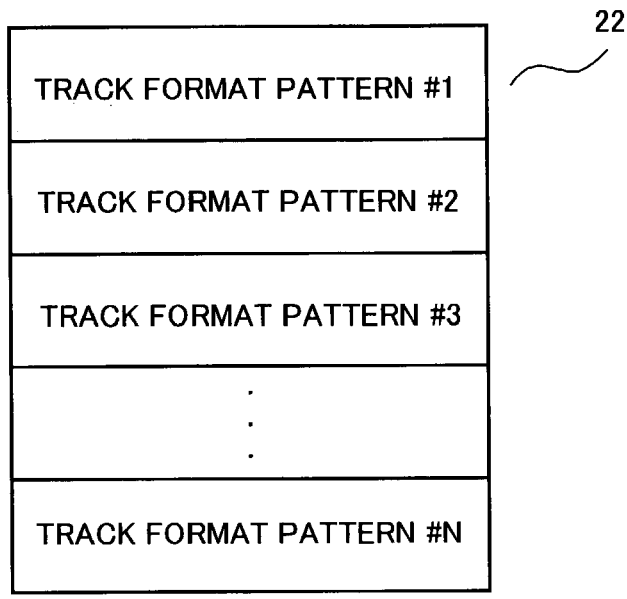
FIG. 5 is a diagram depicting the configuration of the format list table in FIG. 2.
Figure 6:
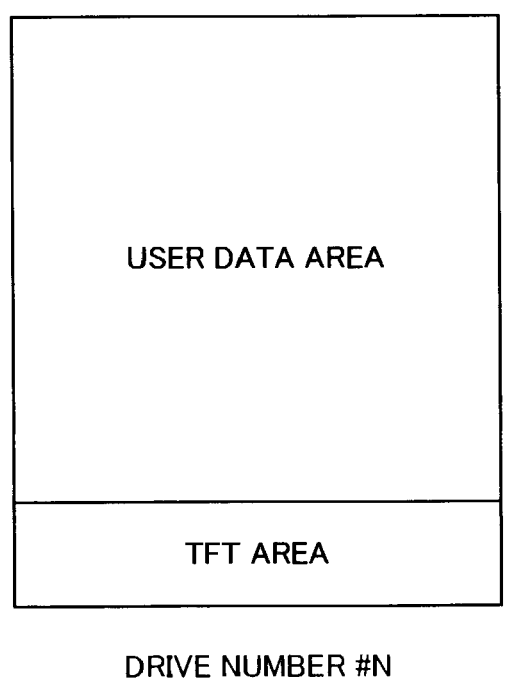
FIG. 6 is a diagram depicting the storage area of the magnetic disk in FIG. 2.
Figure 7:
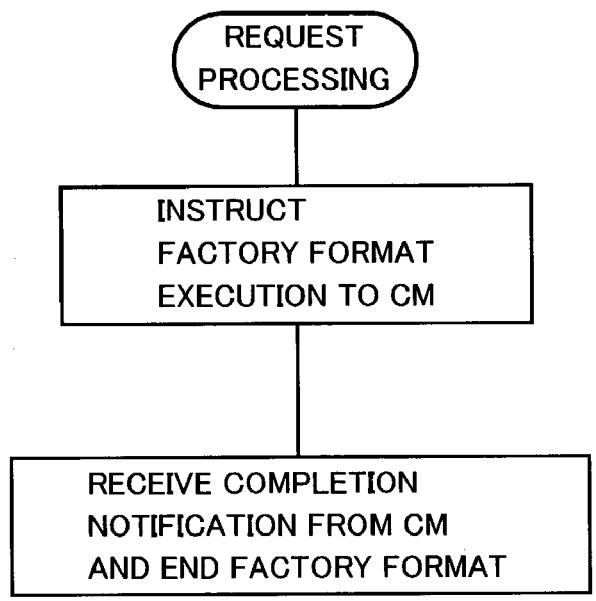
FIG. 7 is a flow chart depicting the format processing of the management terminal in FIG. 2.
Figure 8:
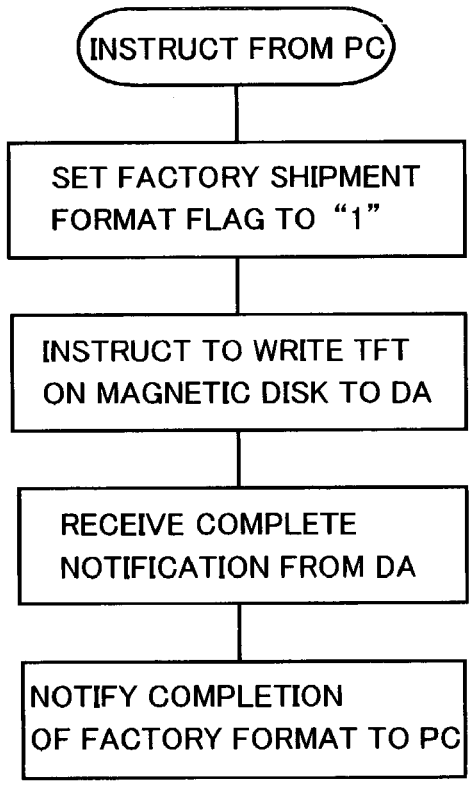
FIG. 8 is a flow chart depicting the format processing of CM in FIG. 2.
Figure 9:
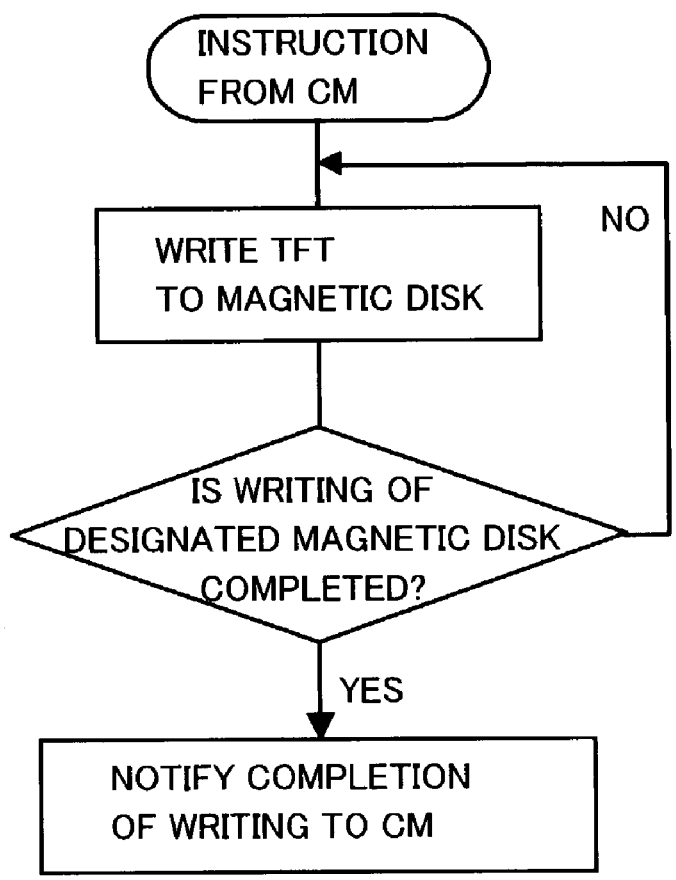
FIG. 9 is a flow chart depicting the format processing of DA in FIG. 2.

FIG. 2 is a diagram depicting the format processing of an embodiment of the present invention, FIG. 3 is a diagram depicting the configuration of the track management table in FIG. 2, FIG. 4 is a diagram depicting the format of the track management table in FIG. 3, FIG. 5 is a diagram depicting the configuration of the format list table in FIG. 2, FIG. 6 is a diagram depicting the storage area of the magnetic disk in FIG. 2, FIG. 7 is a flow chart depicting the format processing of the management terminal in FIG. 2, FIG. 8 is a flow chart depicting the format processing of CM in FIG. 2, and FIG. 9 is a flow chart depicting the format processing of DA in FIG. 2.

In FIG. 2, identical reference symbols have been assigned to identical components with those in FIG. 1. As FIG. 2 shows, in factory format processing, a track management table (hereafter TFT: Track Format Table) 20 is inside the FCU 1. As FIG. 3 shows, the TFT 20 is comprised of a table which has 8 byte management information for each track of each disk drive.

As FIG. 4 shows, the TFT management information of each track is comprised of a track address CCHH (0-2 bytes), 1 byte flags, the number of records of the track, record number and record length. These flags are comprised of a flag which indicates the factory shipment format, and flags #1-#N, which indicate the track format pattern. In other words, a flag to indicate the factory shipment format is disposed in the track table TFT 20 managed inside the FCU 1.

The factory formatting method is implemented by setting the factory shipment format flag of TFT 20 to "1", and transferring only the TFT 20 to the magnetic disk 2. As FIG. 6 shows, this TFT 20 is stored in the TFT area, which is a part of the management area of each disk drive, except the user data area. The TFT area is within 10 tracks of the magnetic disk, and it makes it unnecessary to write each track of the magnetic disk as was performed conventionally, so high-speed factory formatting becomes possible.

As FIG. 2 shows, it is possible to perform factory formatting with a user arbitrary format by creating the factory format list table (hereafter FFLT: Factory Format List Table) 22 in the FCU 1. As FIG. 5 shows, the FFLT 22 can store a plurality of factory shipment track format patterns, and a user can set a plurality of arbitrary patterns from the maintenance terminal (e.g. PC) 4. The TFT 20 has a plurality of flags to indicate the track format so as to store the track formats patterns which the user arbitrarily set in the flags. The factory formatting using a user arbitrary format is implemented by setting a flag corresponding to the track format pattern specified by the user in the TFT 22 to "1", and transferring only the TFT 22 to the magnetic disk.

By executing the respective micro program of the maintenance terminal (e.g. PC) 4/CM 12/DA 16, factory formatting is executed. FIG. 7, FIG. 8 and FIG. 9 show the processing flow of the maintenance terminal (e.g. PC) 4/CM 12/DA 16 respectively.

Factory format processing of magnetic disks according to the present invention will now be described with reference to FIG. 2 and FIG. 7 to FIG. 9.

[1] As FIG. 7 shows, the maintenance terminal (e.g. PC) 4 sends a factory format execution instruction to the CM 12. At this time, the target disk drive and the target range (track range) of the factory formatting are instructed so as to execute factory formatting in the range desired by the user. For example, if the magnetic disk system is shared by a plurality of computer systems, factory formatting can be performed only for the area used by the user. In the factory format instruction, the following parameters can be set.
All or specified disk drives
All or specified track

[2] As FIG. 8 shows, according to the instruction from the maintenance terminal (e.g. PC) 4, the CM 12 sets the factory shipment format flag of the TFT 20 of the target disk drive to "1".

[3] The CM 12 instructs the DA 16 to write the TFT 20 updated in [2] to the magnetic disk 2.

[4] As FIG. 9 shows, the DA 16 receives the instruction from the CM 12 and writes the TFT 20 to the magnetic disk 2.

[5] The DA 16 completes writing the TFT 20 in the specified range to the magnetic disk 2, and notifies the completion to the CM 12.

[6] The CM 12 notifies the completion of factory formatting to the maintenance terminal (e.g. PC) 4.

[3]-[6] and [1]-[2] are executed asynchronously.

Read/write Processing After Factory Formatting

As described above, according to the present invention, factory formatting is implemented by maintaining the status of the factory shipment format flag as "1" in the TFT 20, so effective data does not exist on the track of the actual magnetic disk 2. Therefore when an I/O (read/write) request for this track is received from the host, the FCU 1 must process as if HA and standard R0 data actually exist on the magnetic disk 2. This processing is executed by a micro program of the CA 10.

Figure 10:
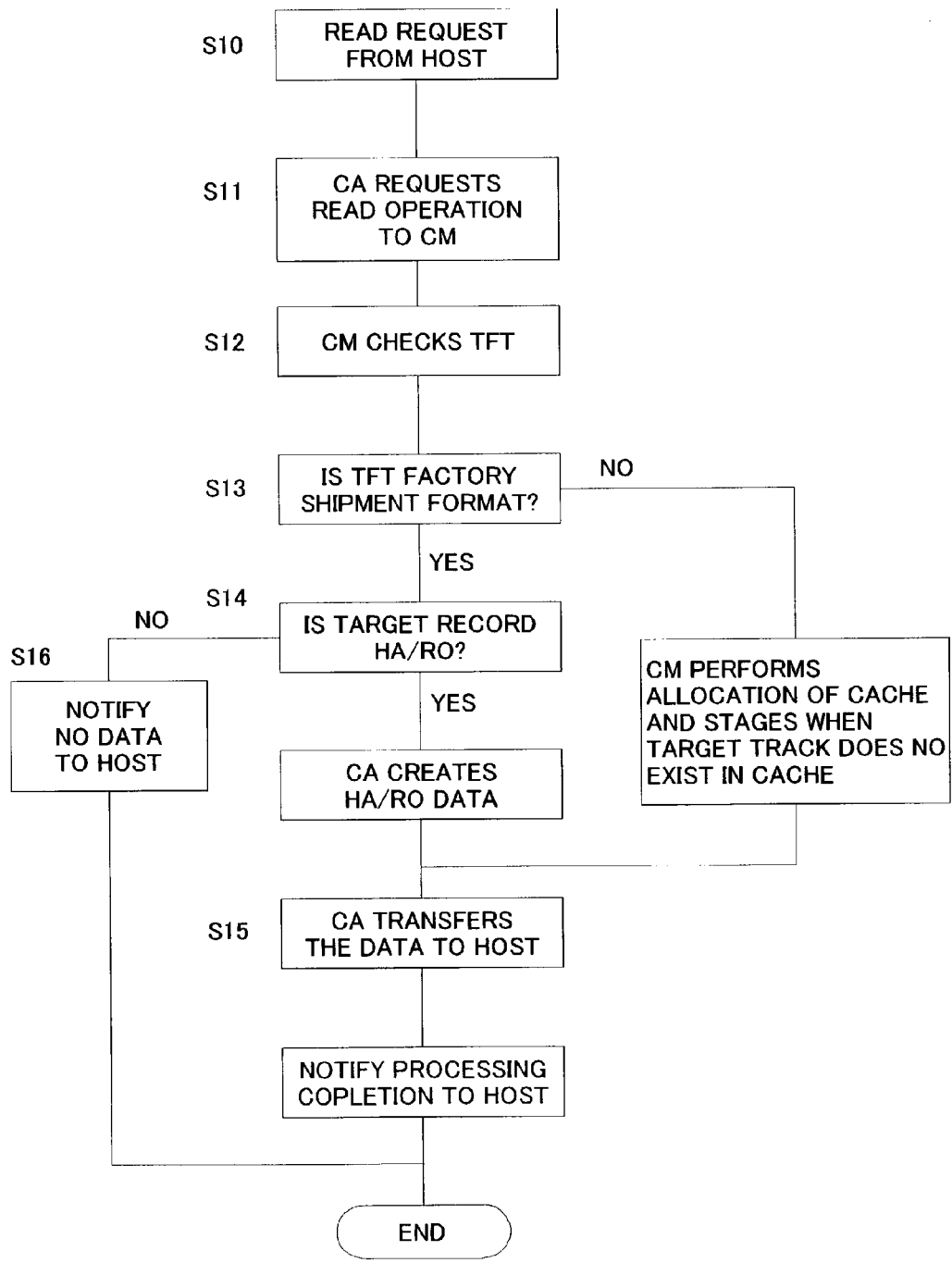
FIG. 10 is a flow chart depicting the read processing in the configuration in FIG. 2.

At first, the processing of the FCU 1 for the read request from the HOST 3 after factory formatting will be described referring to FIG. 10.

(S10) The HOST 3 issues a read command for the factory formatted track.

(S11) The CA 10 which received the command from the HOST 3 sends such information as the track specified by the HOST 3, and requests reading to the CM 12.

(S12) The CM 12 which received the read request from the CA 10 checks the factory shipment format flag of this track referring to the TFT 20.

(S13) When the CM 12 recognizes that the factory shipment format flag of the track is not ON, the CM 12 allocates the cache memory 14, and if the target track is not in the cache memory 14, the CM 12 executes staging of the target data from the magnetic disk 2 to the cache memory 14.

(S14) Referring to the TFT 20, the CA 10 recognizes that the factory shipment format flag is ON, and checks whether the read command from the HOST 3 is for the HA/standard R0. If the read command is for the HA/standard R0, HA/standard R0, which is the data of the factory shipment format, is created in the internal buffer.

(S15) The CA 10 transfers the data on the cache 14 or internal buffer to the HOST 3. And the CA 10 notifies the read processing completion to the HOST 3.

(S16) If the read command is not for the HA/standard R0 in step S14, an actual format was not created on this disk in the factory formatting, so the CA 10 notifies the HOST 3 that there is no data, and ends processing.

Figure 11:
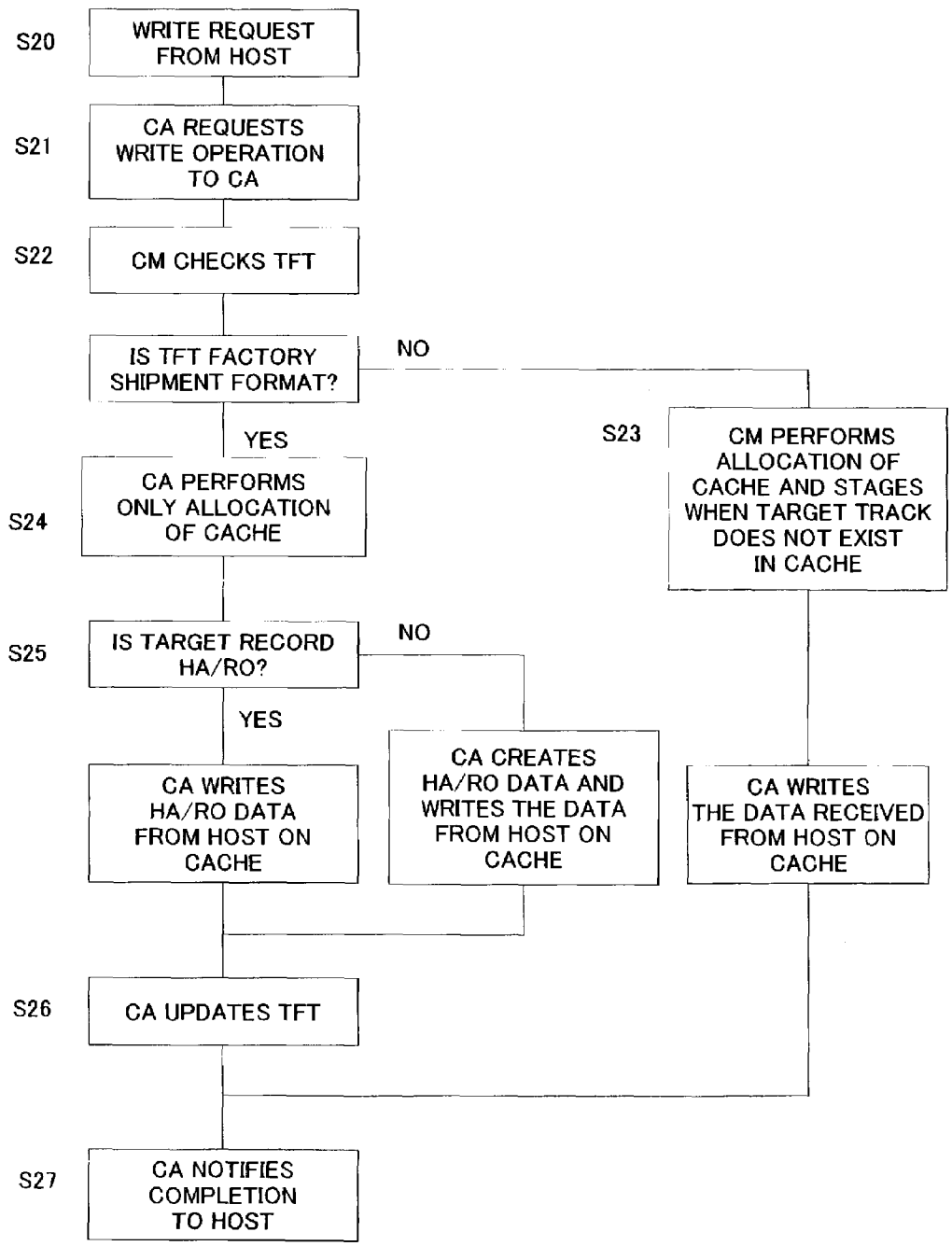
FIG. 11 is a flow chart depicting the write processing in the configuration in FIG. 2.

Now the write processing immediately after factory formatting will be described referring to FIG. 11.

(S20) The HOST 3 issues a write command to the factory formatted track.

(S21) The CA 10 which received the command sends such information as the track specified by the HOST 3, and requests writing to the CM 12.

(S22) The CM 12 which received the write request from the CA 10 checks whether the factory shipment format flag is ON referring to the TFT 20.

(S23) If the factory format flag is not ON, the track of the magnetic disk has actually been formatted, so the CM 12 allocates the cache memory 14, and if the target track is not in the cache memory 14, the CM 12 executes staging of the target data from the magnetic disk 2 to the cache memory 14. And the CA 10 writes the data received from the HOST 3 to the cache memory 14, and processing advances to the step S27.

(S24) If the CM 12 recognizes that the factory format flag is ON, the CM 12 allocates only the cache memory 14, and instructs the CA 10 to start processing.

(S25) If the target record is HA/R0, the CA 10 writes the HA/R0 data from the HOST 3 on the cache memory 14. If the target record is not HA/R0, the CA 10 creates the HA/standard R0 data on the internal buffer, writes the transfer data to the cache memory 14, and completes the original track data on the cache memory 14.

(S26) When the data writing to the cache memory 14 completes, the CA 10 sets the factory shipment format flag of the TFT 20 of this track to OFF, and updates the track status to be normal.

(S27) The CA 10 notifies the completion of the write processing to the HOST 3.

As is already known, the CM 12 write backs the data of the cache memory 14 to the magnetic disk 2 via the DA 16 asynchronously with an I/O from the HOST 3. By this, this track of the magnetic disk is formatted and original track data is completed.

Figure 12:
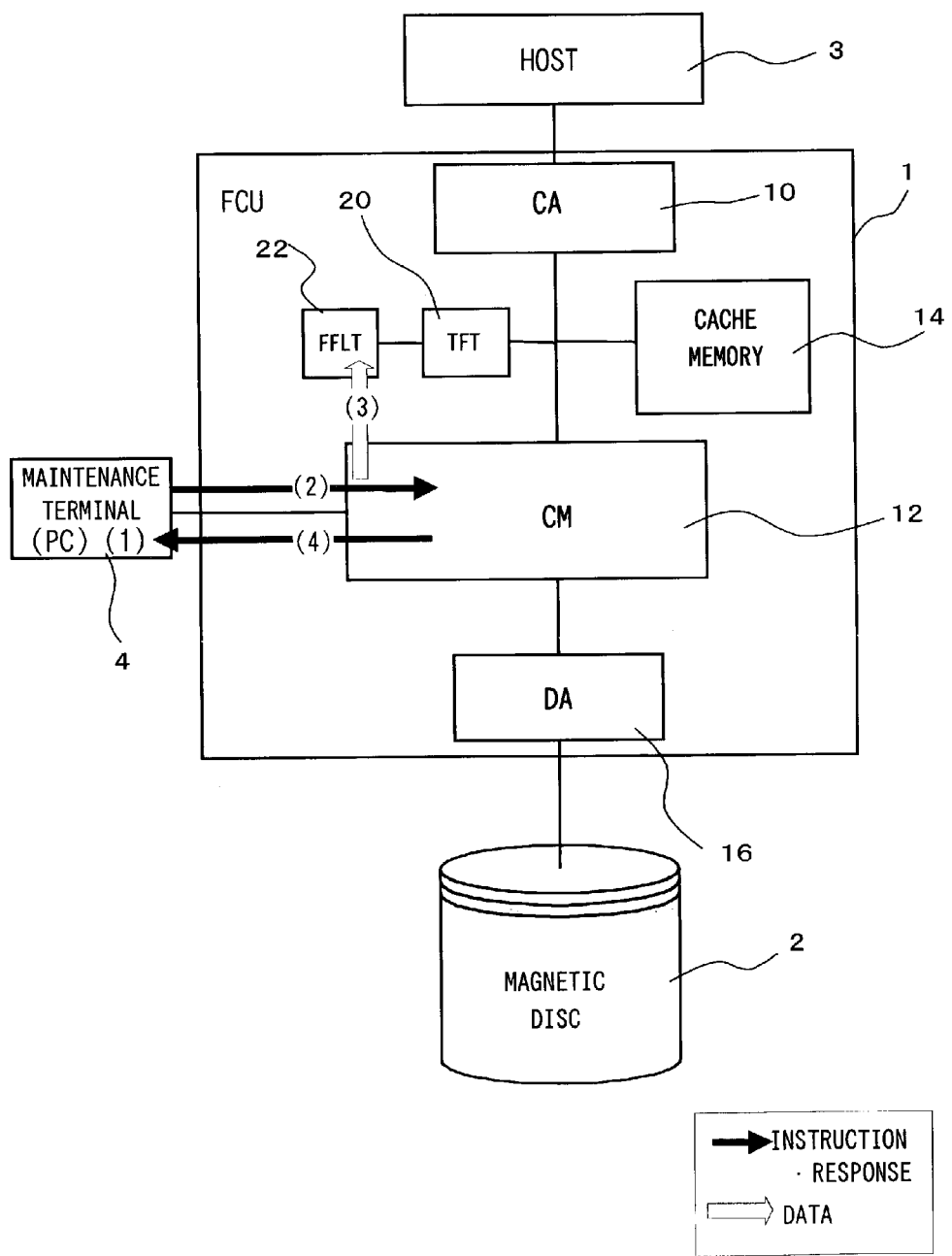
FIG. 12 is a diagram depicting the registration processing of the format list table in FIG. 2.

Also in this embodiment of the present invention, a new FFLT 22 can be created for the user to specify the factory shipment format, which is comprised of arbitrary data patterns. FIG. 12 is a diagram depicting the FFLT registration processing. The registration processing of the factory shipment format to the FFLT 22 will now be described.

In the maintenance terminal (e.g. PC) 4, the data pattern of the factory shipment format is set ([1]). The maintenance terminal (e.g. PC) 4 instructs the CM 12 to register the registered data pattern of the factory shipment format to the FFLT 22 ([2]). The CM 12 receives the instruction of the maintenance terminal (e.g. PC) 4, and registers the data pattern of the factory shipment format to the FFLT 22 ([3]). The CM 12 notifies the maintenance terminal (e.g. PC) 4 that the registration of the factory shipment format to the FFLT 22 has completed ([4]).

In the factory format execution processing using the FFLT 22, a processing for specifying the track format pattern registered in the FFLT 22 from the maintenance terminal (e.g. PC) 4 is added to the processing described with reference to FIG. 7 to FIG. 9.

In the read processing using the FFLT 22, the data pattern specified in the FFLT 22 is created on the internal buffer. Also in the write processing using the FFLT 22, the data pattern specified in the FFLT 22 is created on the internal buffer, and the data pattern is written to the cache memory, so as to complete the original track data on the magnetic disk.

As described above, according to the present invention, factory formatting is implemented by the factory shipment format flag in the TFT 20, not by a conventional method which involves accessing a magnetic disk, so it is possible to execute factory formatting with about $\frac{1}{100}$ the processing time in comparison with a conventional method, which allows a dramatic decrease in processing time and a decrease in cost accordingly.

In the present invention, the factory shipment format, which is comprised of an arbitrary data pattern, can be registered in the FFLT 22, and the factory format can be easily changed to an arbitrary factory shipment format at the user location in a short time.

Remote Magnetic Disk Control Apparatus (RFCF)

Figure 13:
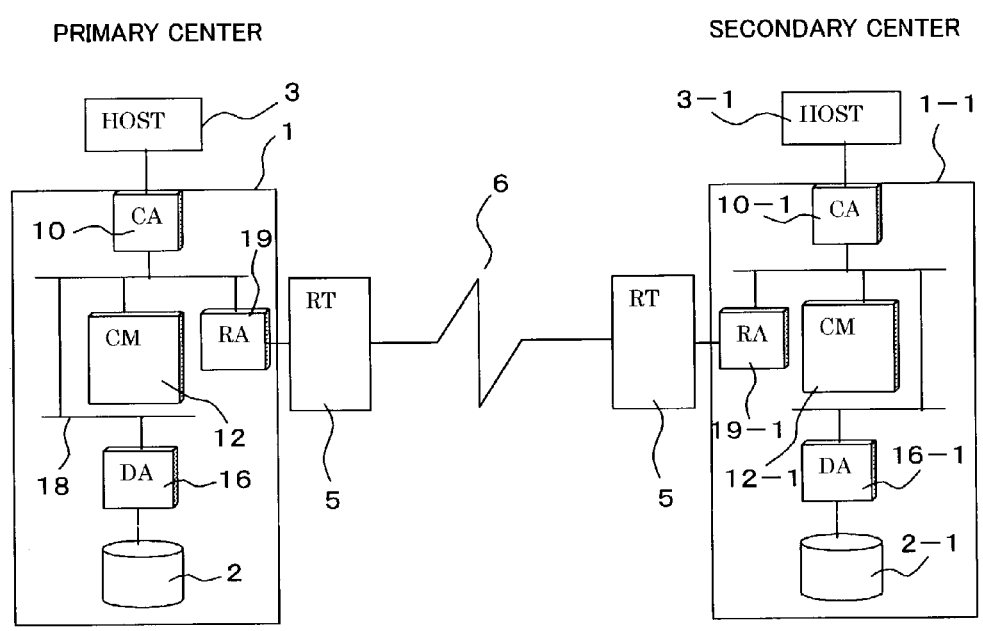
FIG. 13 is a diagram depicting the configuration of the remote file control system of another embodiment of the present invention.

FIG. 13 is a diagram depicting a remote magnetic disk control apparatus (hereafter RFCF) using the magnetic disk control apparatus in FIG. 1. The remote magnetic disk control apparatus is the FCU 1 which has the backup function of the data in a remote area.

The computer center (hereafter primary center) 3 mirrors the data of the primary center 1 to another FCU disposed at a remote area (hereafter secondary center) 1-1 in parallel with normal operations, so that even if a major disaster occurs to either one of the centers, data remains in the other center, which was not affected by the disaster.

As FIG. 13 shows, in the RFCF 1, a module for controlling communication, called the RA 19, has been added to the FCU 1. The RA (Remote Adapter) 19 is an adapter which interfaces the communication control apparatus (RT: router) 5 and the FCU. The RA 19 is connected to the RA 19-1 of the secondary FCU 1-1 via the RT 5, leased line 6 and RT 5. The secondary FCU 1-1 also has the same configuration as the primary FCU (RFCF) 1, and comprises CA 10-1, CM 12-1, DA 16-1, magnetic disk 2-1, and RA 19-1.

In the FCU 1, an internal directory called the ACB is used. A series of processing content (e.g. read) flow, which the host requests by command, is called an "operation", and the individual internal processing required for executing this operation (e.g. processing for loading data from a magnetic disk to the memory) is called an "action". In the FCU 1, ACB is used as a directory to notify an action required for executing an operation to each module.

In the RFCF 1, a real-time transfer method is executed. The real-time transfer is a function that when a write operation (Write I/O) is executed from the primary host 3 to the primary FCU 1, the primary FCU 1 writes the data to the local RAID disk (cache 14, magnetic disk 2), and at the same time, transfers the same data to the secondary center FCU 3-1 as well.

This RFCF 1 has a Volume Pair Copy function, to copy the data in the primary side disk 2 to the secondary side disk 2-1 for mirroring. The primary host 3 instructs the primary FCU 1 about the device to copy and the range of copying (start CCHH—end CCHH), then the tracks in this range are all copied from the primary FCU 1 to the secondary FCU 1-1. For example, the Volume Pair Copy is used when the secondary FCU 1-1 is disposed to change to the remote copy system after the primary FCU 1 is operated in a conventional system.

Figure 14:
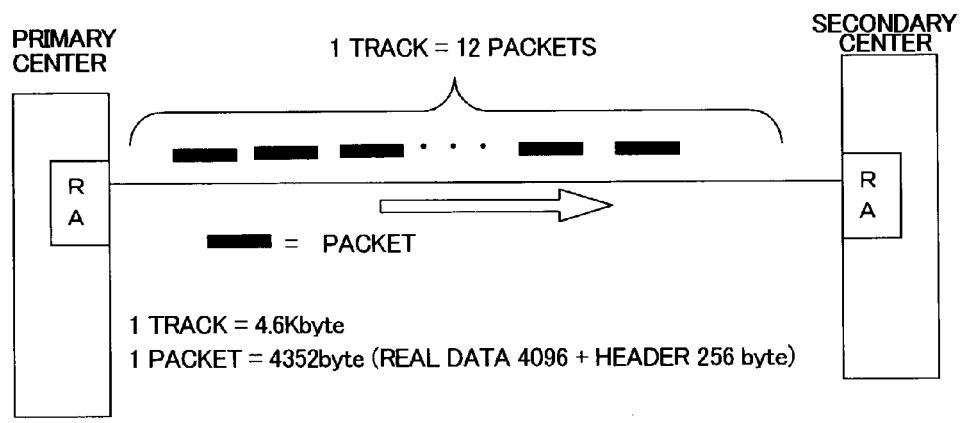
FIG. 14 is a diagram depicting the packet transfer in FIG. 13.
Figure 15:
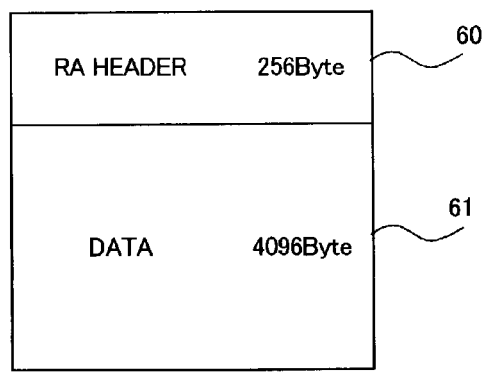
FIG. 15 is a diagram depicting the transfer packet in FIG. 14.

As FIG. 14 shows, data is transferred from the primary RA 19 to the secondary RA 19-1 by a packet. One packet is 4352 bytes (256+4096), and if one track is 46 Kbytes, then one track consists of 12 packets. As FIG. 15 shows, the first 256 bytes are called the "RA Header" 60, and is used for communication between the primary RA 19 and the secondary RA 19-1. In the RA Header, the target device number, cylinder and head value are stored. In the latter 4096 bytes of the packet, the user data 61 is stored.

Now Volume Pair Copy processing will be described.

Copy Processing of First Embodiment

In RFCF 1, if the track is Factory Format in Volume Pair Copy, the RA 19 of the primary center FCU 1 creates the HA/R0 section, and transfer it to the secondary center 1-1. By this, Volume Pair Copy can be implemented even if Factory Format is used.

Figure 16:
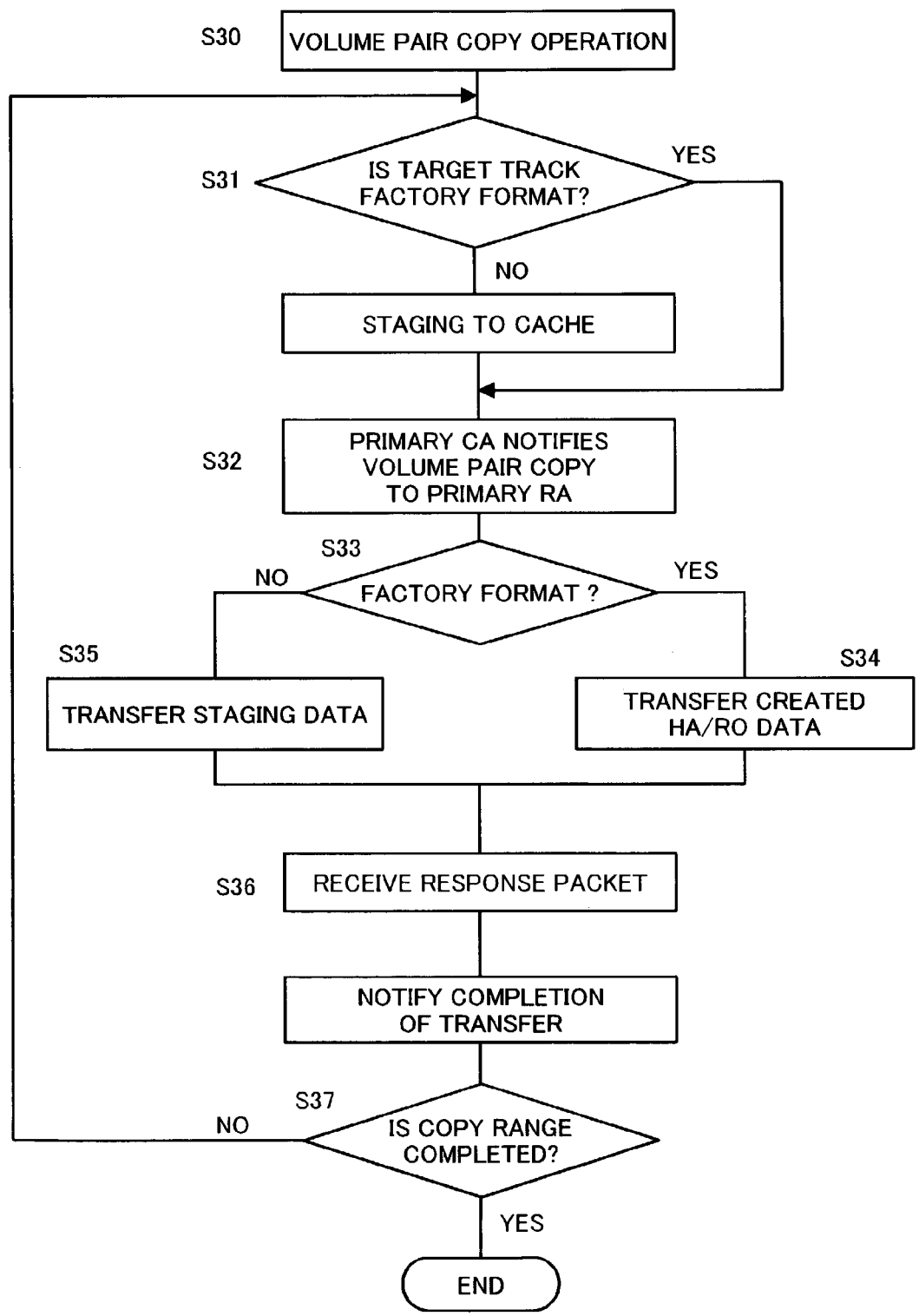
FIG. 16 is a flow chart depicting the copy processing of the first embodiment in FIG. 13.

The copy processing content of the first embodiment will now be described referring to FIG. 16.

(S30) The primary FCU 1 receives the Volume Pair Copy operation notice from the primary HOST 3.

(S31) The CM 12 judges whether this track is Factory Format based on the TFT 20, and if this track is not Factory Format, the primary CM 12 reads this track from the disk 2 (actually the DA executes this), and develops the data on the cache memory 14 of the primary CM 12 itself. If the TFT 20 of this track is Factory Format, the CM 12 does not execute this operation.

(S32) The primary CM 12 notifies the primary RA 19 to execute Volume Pair Copy from the primary FCU 1 side to the secondary FCU 1-1 side. At this time, the primary CM 12 notifies the volume number, cylinder address, and head address, for which Volume Pair Copy is executed, to the primary RA 19 via ACB. The instruction to transfer HA/R0 is also written.

(S33) The primary RA 19 reads the TFT 20 and judges whether this track is Factory Format.

(S34) If the target track of the remote transfer is Factory Format, the primary RA 19 creates HA/R0 data, and transfers the data to the secondary center 1-1.

(S35) If the target track of the remote transfer is not Factory Format, the primary RA 19 reads this track (one track) on the cache memory 14, and transfers the track to the secondary center 1-1. After transfer ends, the primary RA waits for a response from the secondary RA. The secondary RA 19-1 writes the transferred data to the cache memory 14-1 on the secondary CM 12-1. The secondary RA 19-1 returns the response packet responding to the remote transfer of this track to the primary RA 19.

(S36) When the primary RA 19 receives the response from the secondary RA 19-1, the primary RA 19 notifies the primary CM 12 that the transfer (only for one track) has completed.

(S37) The primary FCU 1 checks whether the range of Volume Pair Copy has completed, and if not completed, processing returns to step S31, and operations in S31-S36 are repeated until the range of Volume Pair Copy completes.

Figure 17:
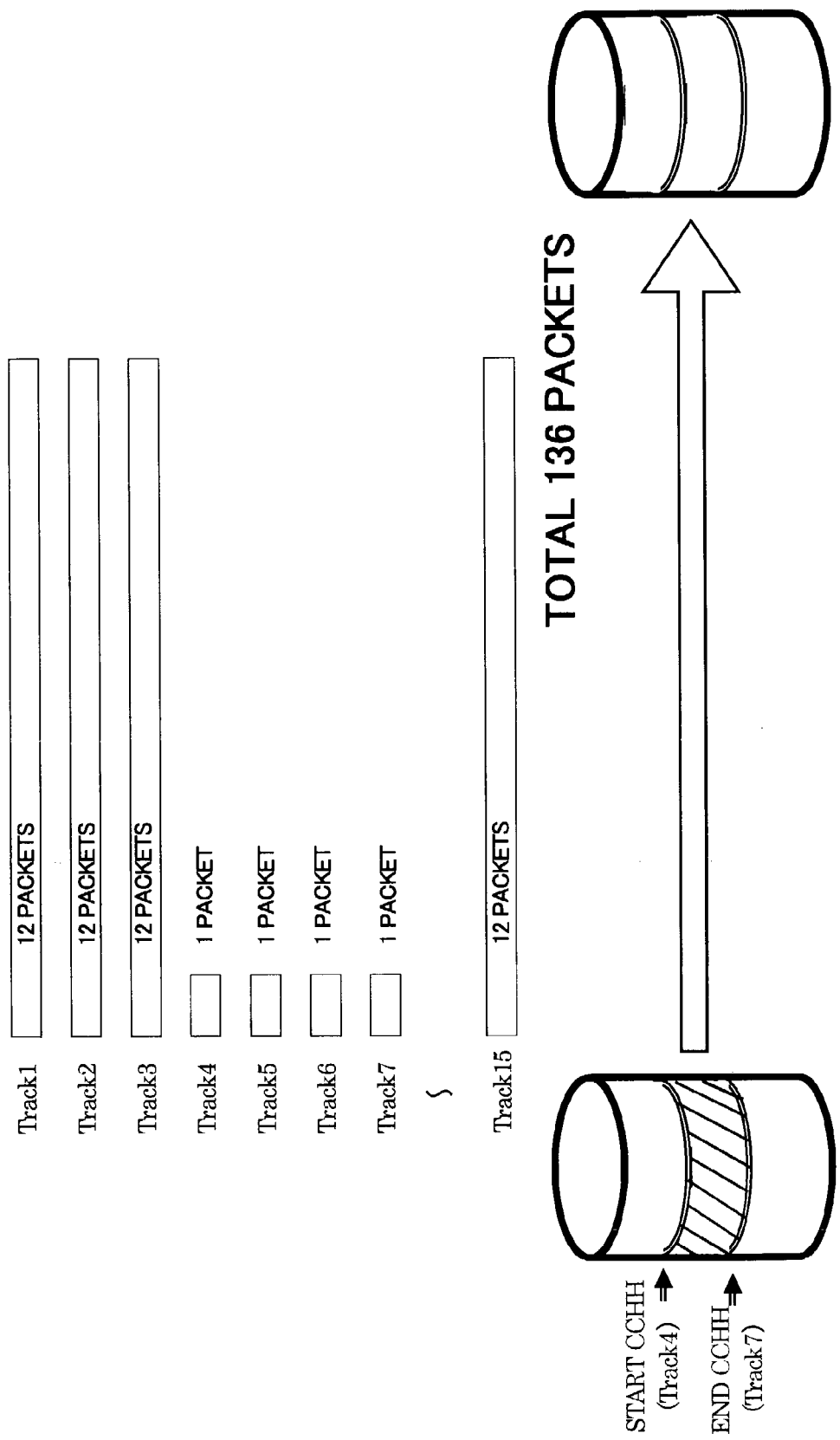
FIG. 17 is a diagram depicting the remote transfer operation in FIG. 14.

FIG. 17 is a diagram depicting operation when Factory Format Tracks of tracks 4-7 exist in the tracks 1-15 in the range of Volume Pair Copy according to the first embodiment, and 136 packets are transferred from the primary RA 19 to the secondary RA 19-1.

Copy Processing of Second Embodiment

In the first embodiment, if n number of Factory Format Tracks exist, transfer is executed n times. In the second embodiment, the transfer is completed all at once For this, the primary CM 12 checks whether Factory Format exists in the range of Volume Pair Copy, and if it exists, the primary CM 12 notifies the CCHH (single or plural depending on the case) which exists to the primary RA 19 via ACB. The primary RA 19, which received the notice, as shown in FIG. 19, writes 'X' which indicates Factory Format and the range of the Factory Format Tracks (start CCHH, end CCHH) in the RA Header 60, and notifies this information to the secondary RA 19-1. In other words, unlike the first embodiment, the primary RA 19 does not create HA/R0. The secondary RA 19-1 recognizes that Factory Format is created for a plurality of tracks by the RA Header 60, and creates a plurality of tracks only with HA/R0 on the secondary cache 14-1.

Figure 18:
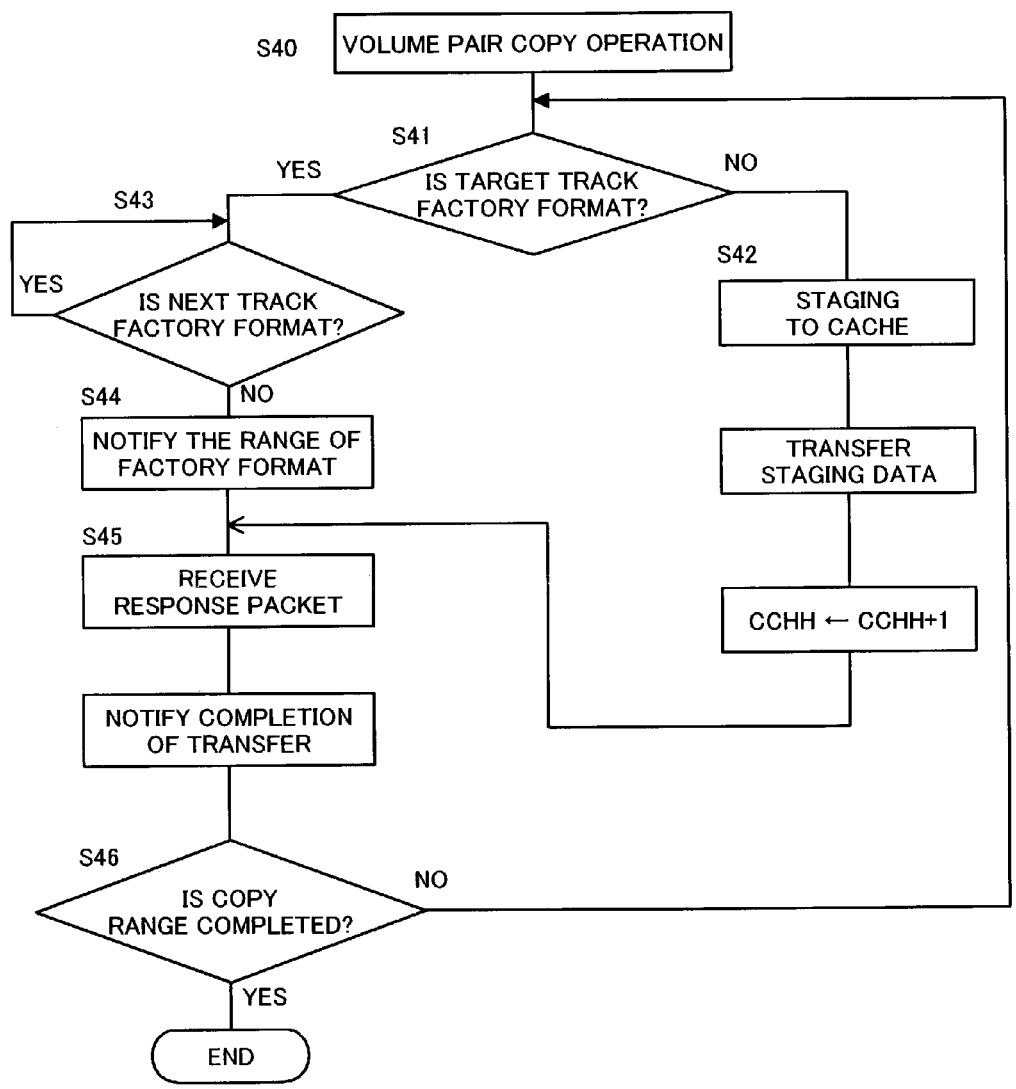
FIG. 18 is a flow chart depicting the copy processing of the second embodiment in FIG. 13.

Copy processing of the second embodiment will be described referring to FIG. 18.

(S40) The primary FCU 1 receives a Volume Pair Copy operation notice from the HOST 3.

(S41) The primary CM 12 judges whether this track is Factory Format by the TFT 20.

(S42) If this track is not Factory Format, the primary CM 12 reads this track from the disk 2, and develops the data on the cache memory 14 of the primary CM 12 itself. The primary CM 12 instructs the primary RA 19 to copy this track.

The primary RA 19 reads the track data from the cache 14, and sends a packet to the secondary RA 19-1. The primary CM 12 updates this track CCHH to (CCHH+1). The processing advances to step S45.

(S43) When the primary CM 12 recognizes that this track is Factory Format by the TFT 20, the primary CM 12 judges whether the next track is Factory Format.

(S44) If the next track is not Factory Format, the primary CM 12 sets the disk drives and range (start CCHH, end CCHH) of the Factory Format in ACB, and notifies the primary RA 19 to copy the data. The primary RA 19 recognizes that this transfer is the transfer of Factory Format Track based on ACB. The primary RA 19 sets a value shown in FIG. 19 at the RA Header 60 of the packet, and transfers this packet to the secondary RA 19-1. The secondary RA 19-1 recognizes that this transfer is a transfer of the Factory Format Track by the RA Header 60, creates HA/R0 for the track range shown in the RA Header 60, and writes this to the cache memory 14-2.

(S45) The secondary RA 19-1 sends the response packet to the primary RA 19. When the primary RA 19 receives the response packet from the secondary RA 19-1, the primary RA 19 notifies the primary CM 12 that copying of this track is completed.

(S46) The primary FCU 1 checks whether the range of Volume Pair Copy has completed, and if not completed, processing returns to step S41, and operations in S42-S45 are repeated until the range of Volume Pair Copy completes.

FIG. 20 is a diagram depicting operation when the Factory Format Tracks of tracks 4-7 exist in the tracks 1-15 in the range of Volume Pair Copy according to the second embodiment, and 133 packets are transferred from the primary RA 19 to the secondary RA 19-1. In the first embodiment, if n number of Factory Format Tracks exist in the range of Volume Pair Copy, transfer from the primary RA to the secondary RA are executed n times. In this embodiment, this transfer can be executed all at once, which decreases the total processing time for I/O.

Figure 21:
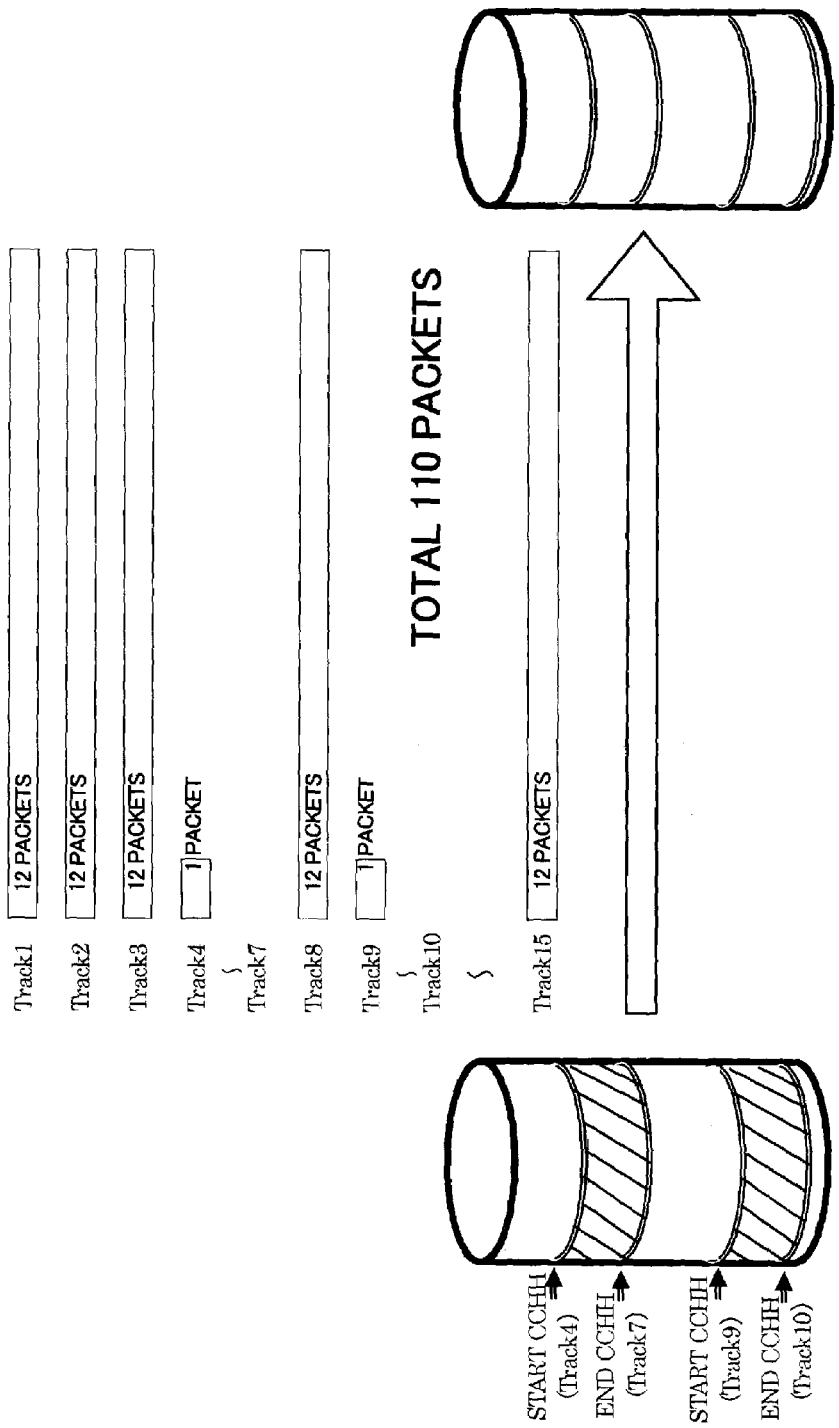
FIG. 21 is a diagram depicting another remote transfer operation in FIG. 18.

FIG. 21 shows an example to support the case when Factory Format Tracks are discrete in one apparatus. This is a diagram depicting operation when the Factory Format Tracks in tracks 4-7 and the Factory Format Tracks in tracks 9-10 are discrete in the tracks 1-15 in the range of Volume Pair Copy, where only 110 packets are transferred.

When the primary CM 12 recognizes that this track is a Factory Format Track based on the TFT 20, this CCHH is temporarily written to the internal memory. The primary CM 12 continuously checks the next track. Since the next track is not a Factory Format Track as a result of checking, the primary CM 12 sets the above track, which was temporarily written, to ACB, and notifies the primary RA 19 to execute Volume Pair Copy of the Factory Format Track. The primary RA 19 recognizes that this transfer is a transfer of a Factory Format Track based on the ACB. The primary RA 19 sets the value shown in FIG. 19 to the RA Header 60 of the packet, and transfers the packet to the secondary RA 19-1. The secondary RA 19-1 recognizes that this transfer is the transfer of the Factory Format Track by the RA Header 60. The secondary RA 19-1 creates HA/R0 on the track shown in the RA Header 60, and writes it to the cache memory 14-2.

According to the first embodiment, if n number of Factory Format Tracks discretely exist in the range of Volume Pair Copy, a transfer of the Factory Format Track from the primary RA to the secondary RA is executed n times, but according to the present embodiment, this transfer can be executed all at once. Therefore the total processing time of the I/O can be dramatically decreased.

Copy Processing of Third Embodiment

In this embodiment, if the range of Factory Format Tracks is from the end of the area of the user data of the device to the end of the subsequent device, the secondary RA voluntarily executes the creation processing of the HA/R0 of the Factory Format Track until the end of the device at the point when the secondary RA writes the end of the transferred user data on the cache memory.

Figure 22:
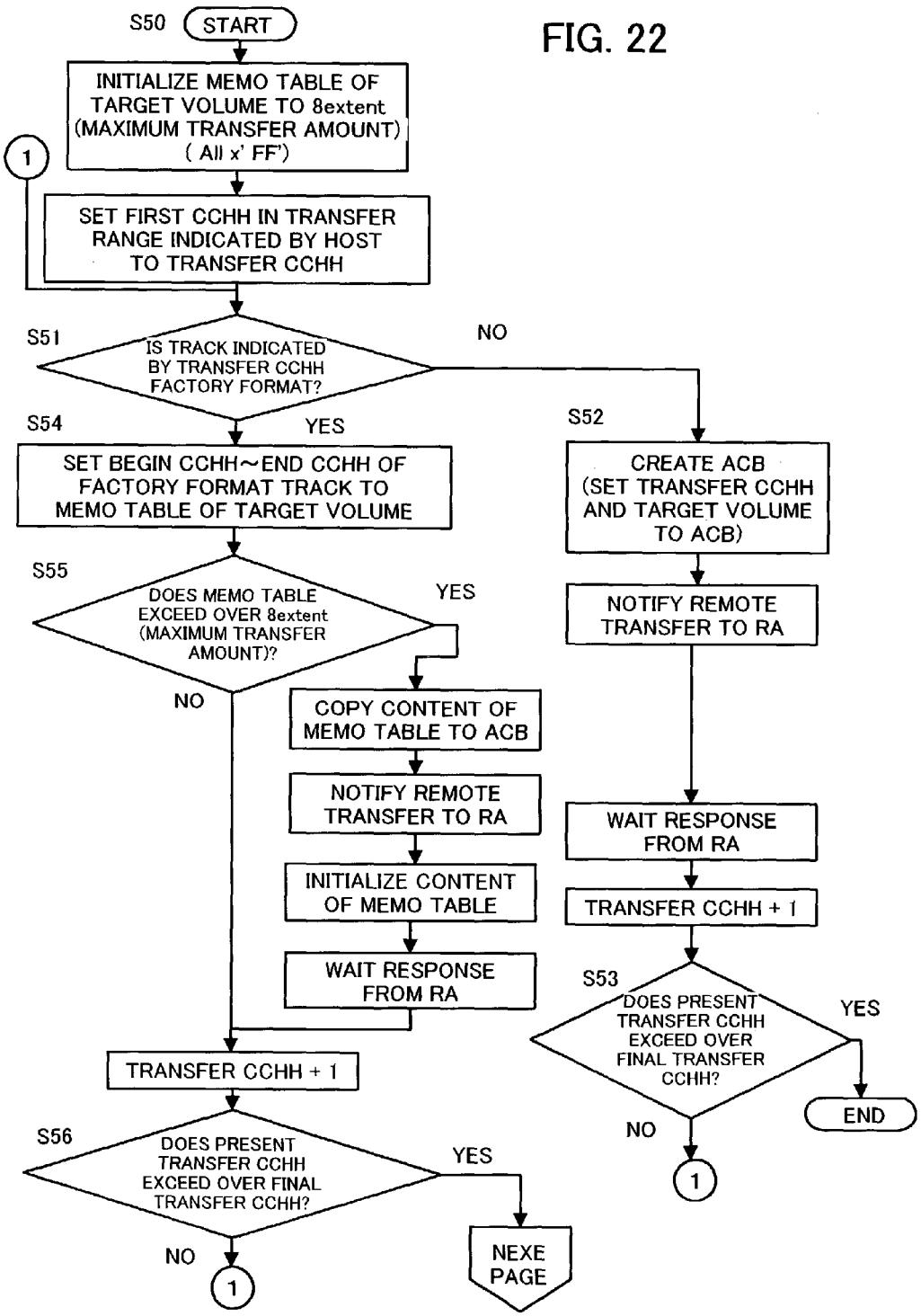
FIG. 22 is a flow chart depicting the copy processing of CM of the third embodiment in FIG. 13 (No. 1)

This processing will be described referring to the CM operation processing flow charts in FIG. 22 and FIG. 23, and the RA operation processing flow chart in FIG. 24.

(S50) When the primary FCU 1 receives the Volume Pair Copy notice from the HOST 3, the CM 12 initializes the memorandum table 62 of the internal buffer in FIG. 25 for the maximum transfer amount. The CM 12 sets the first CCHH in the transfer range instructed by the host to the transfer CCHH.

(S51) The primary CM 12 judges whether this track (transfer CCHH) is a Factory Format based on the TFT 20.

(S52) If this track is not Factory Format, the primary CM 12 reads this track from the disk 2, and develops the data on the cache 14 of the primary CM 12 itself. The primary CM 12 creates ACB and instructs the remote transfer to the primary RA 19. The primary CM 12 then waits for a response from the primary RA 19, and when the response packet from the primary RA 19 is received, the primary CM 12 updates the transfer track CCHH to (CCHH+1).

(S53) The primary CM 12 checks if the range of Volume Pair Copy has completed, and if not completed, processing returns to step S51, and if completed, processing ends.

(S54) When the primary CM 12 recognizes that this track is Factory Format based on the TFT 20, the primary CM 12 sets the start and end of the Factory Format Track in the memorandum table 62 of this volume.

(S55) The primary CM 12 judges whether the memorandum table 62 exceeded the maximum transfer amount. If the memorandum table 62 exceeds the maximum transfer amount, the primary CM 12 copies the content of the memorandum table 62 to the ACB, and notifies the remote transfer to the RA 19. The primary CM 12 initializes the memorandum table 62, waits for a response from the primary RA 19, and when the response packet from the primary RA 19 is received, the primary CM 12 updates the transfer track CCHH to (CCHH+1).

Figure 23:
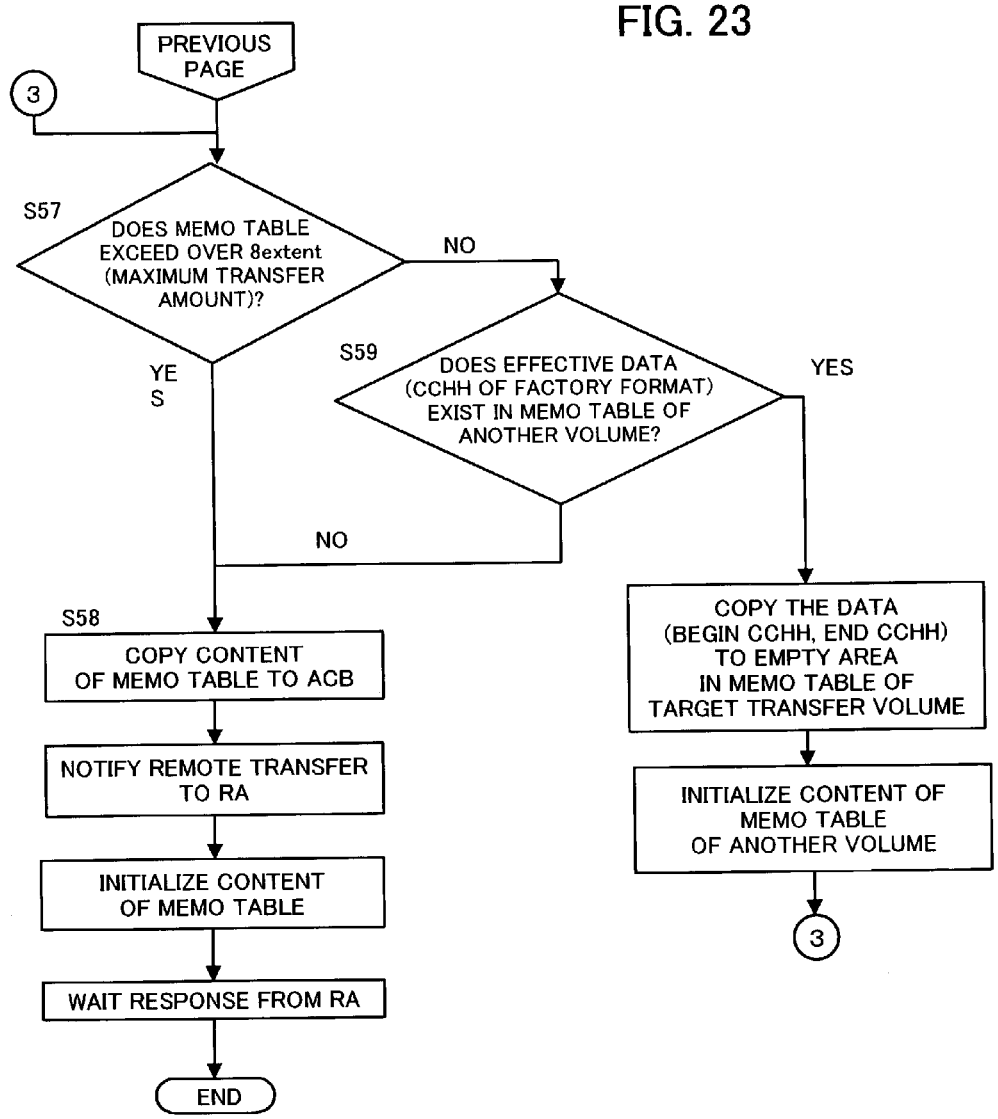
FIG. 23 is a flow chart depicting the copy processing of CM of the third embodiment in FIG. 13 (No. 2)

(S56) The primary CM 12 checks if the range of Volume Pair Copy has completed, and if not completed, processing returns to step S51, and if completed, processing advances to step S57 in FIG. 23.

(S57) The primary CM 12 judges whether the memorandum table 62 exceeded the maximum transfer amount.

(S58) If the memorandum table 62 exceeds the maximum transfer amount, the primary CM 12 copies the content of the memorandum table 62 to the ACB, and notifies the remote transfer to the RA 19. The primary CM 12 initializes the memorandum table 62, waits for a response from the primary RA 19, and when the response packet from the primary RA 19 is received, the primary CM 12 ends processing.

(S59) If the memorandum table 62 does not exceed the maximum transfer amount, the primary CM 12 checks whether effective data (Factory Format Track CCHH) is in the memorandum table 62 of another volume, and if the data does not exist, processing advances to step S58, and if it exists, the primary CM 12 copies the data (start CCHH, end CCHH) to the open area of the memorandum table of the transfer target volume, initializes the memorandum table of the other volume, and returns to step S57.

Figure 24:
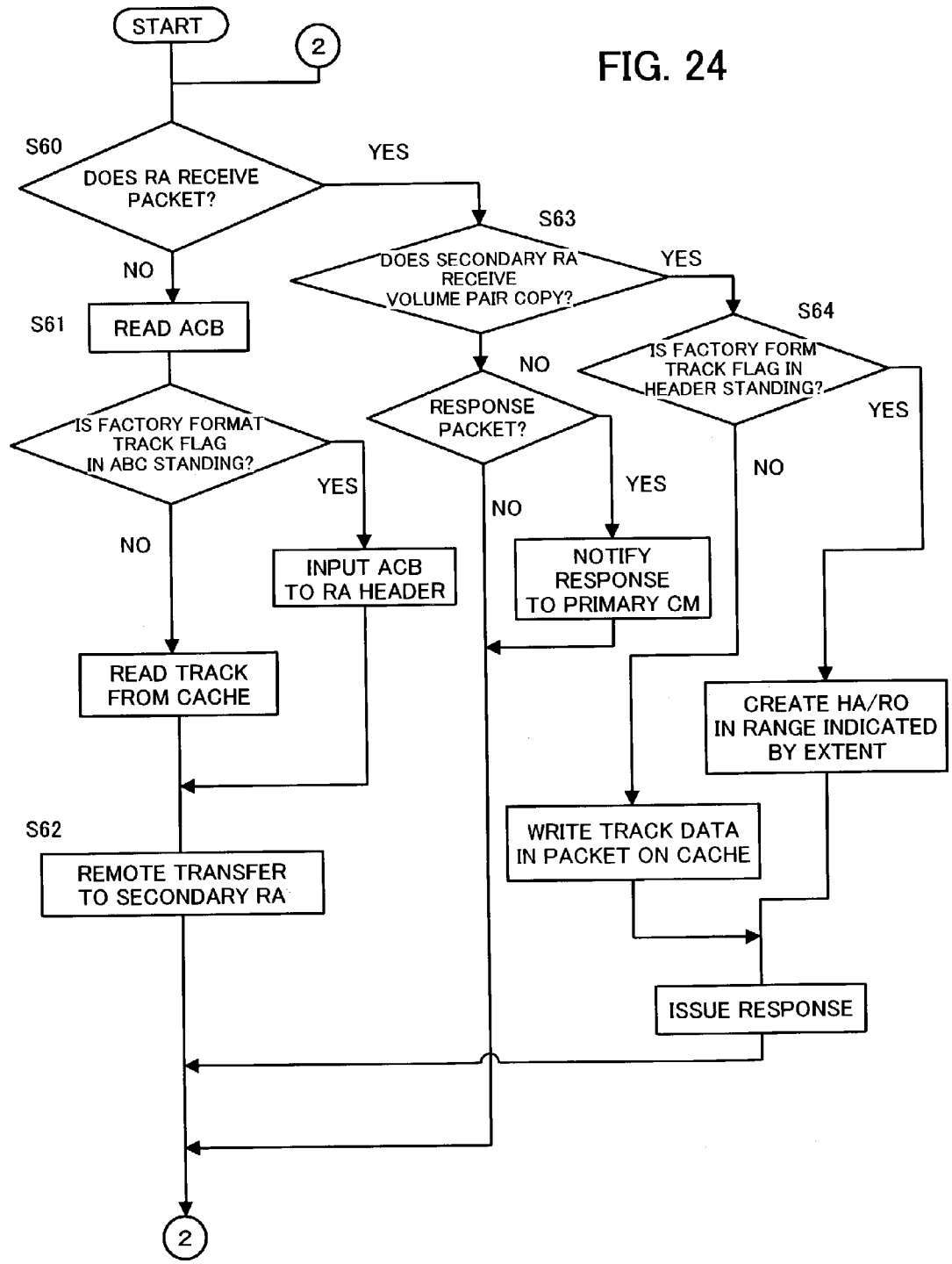
FIG. 24 is a flow chart depicting the copy processing of RA of the third embodiment in FIG. 13.

RA, on the other hand, executes the processing in FIG. 24.

(S60) RA 19 judges whether the packet from the secondary RA 19-1 is received.

(S61) The primary RA 19 checks whether the transfer is a transfer of the Factory Format Track from the ACB, and if a flag of the Factory Format Track is standing, the primary RA 19 inputs the ACB to the RA Header 60 of the packet. If the Factory Format Track flag is not standing, the primary RA 19 reads the track from the cache memory 14.

(S62) And the primary RA 19 executes a remote transfer to the secondary RA 19-1. The secondary RA 19-1 recognizes that the transfer is a transfer of the Factory Format Track from the RA Header 60, creates HA/R0 for the track range indicated in the RA Header 60, and writes the HA/R0 on the cache memory 14-2.

(S63) The secondary RA 19-1 checks whether Volume Pair Copy has been received, and if not received, the secondary RA 19-1 checks whether the transferred packet is a response packet, and if it is a response packet, the secondary RA 19-1 notifies the primary CM 12 that copy of this track has completed.

(S64) Hereafter concerns processing by the secondary RA, which writes the data in the packet transferred from the primary RA to the internal memory of the secondary FCU. If the flag is standing in the RA header of the transferred packet, the secondary RA executes the creation of HA/R0 of the track of Factory Format until the end of the device triggered by the end of the write event of the user data to the cache memory. The secondary RA recognizes the track of Factory Format by the track range (start CCHH end —CCHH) of the Factory Format in the RA header, and creates HA/R0 for this track of the RAID disk at the secondary center side. When this processing ends, the secondary RA writes a track other than the Factory Format of the target user data of Volume Pair Copy to the cache memory of the secondary center. When the write processing of user data to the cache memory ends, the secondary RA transfers the response packet to the primary center to notify that the Volume Pair Copy operation ended normally.

Figure 26:
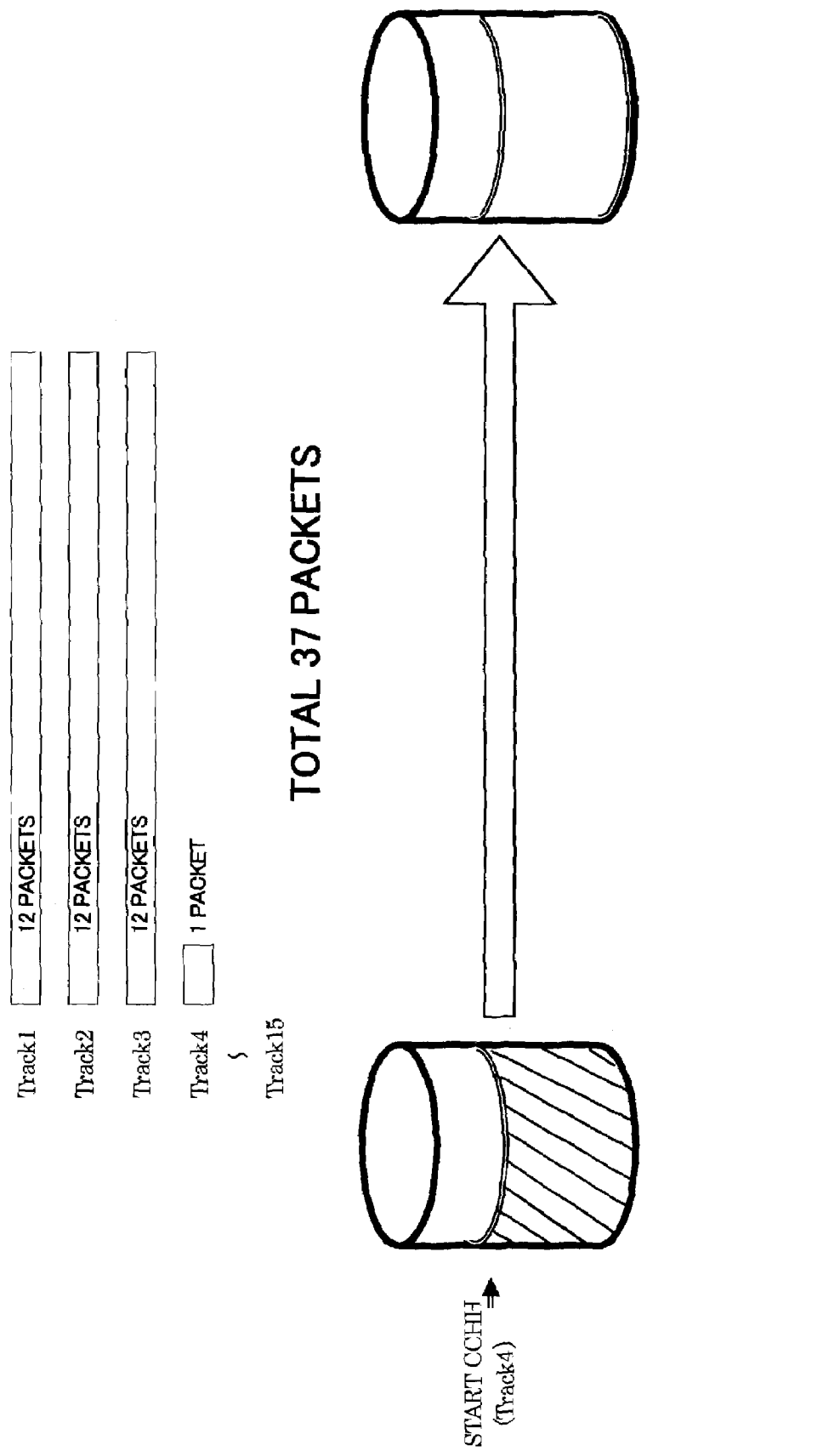
FIG. 26 is a diagram depicting the remote transfer operation in FIG. 22 to FIG. 24.
Figure 27:
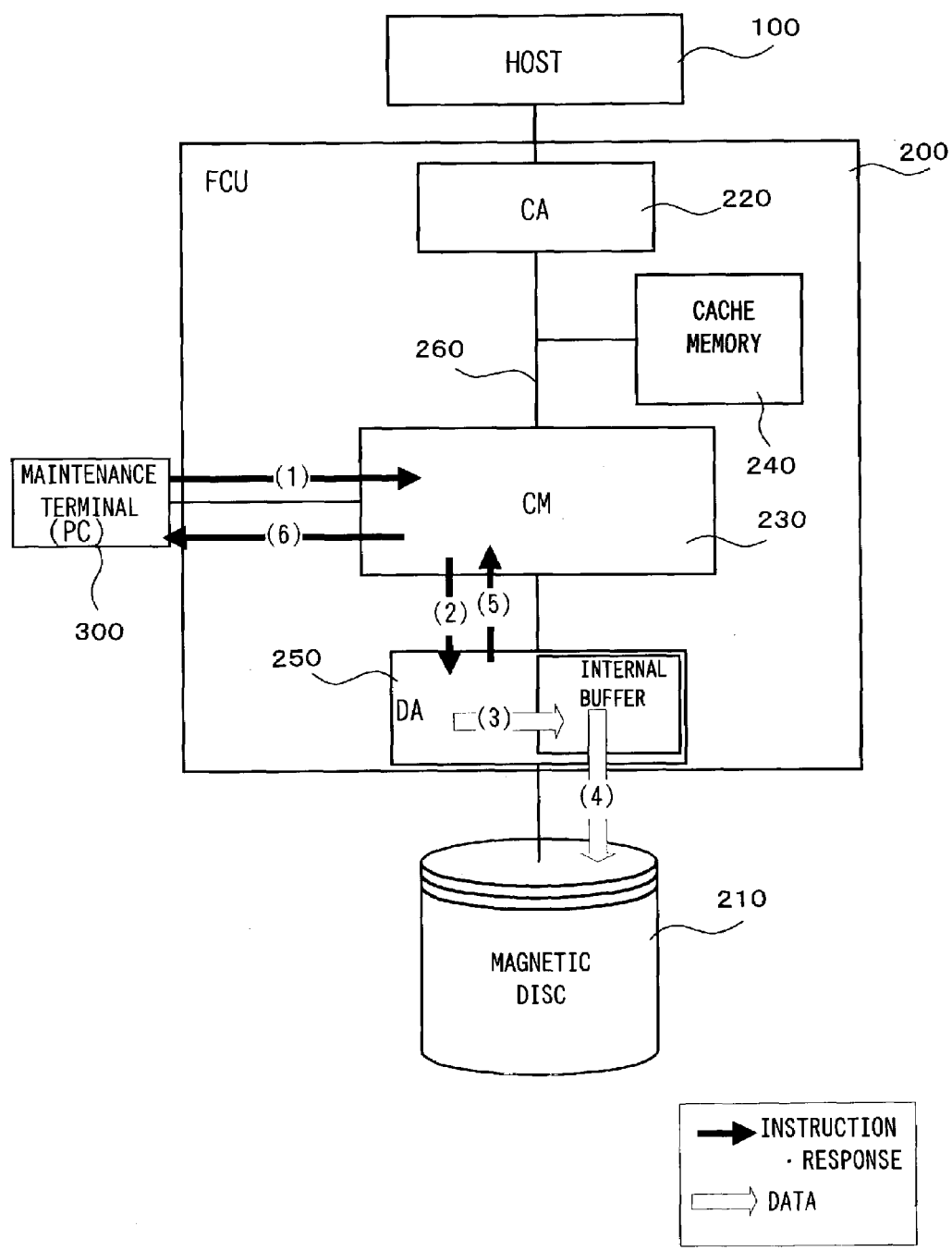
FIG. 27 is a diagram depicting conventional format initialization processing.
Figure 28:
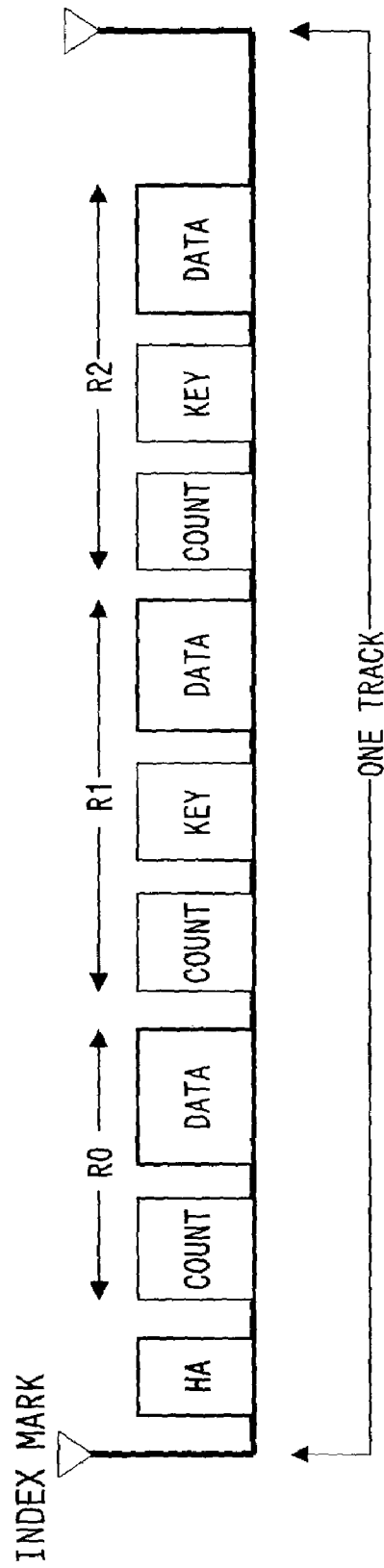
FIG. 28 is a diagram depicting the CKD format of the magnetic disk.
Figure 29:
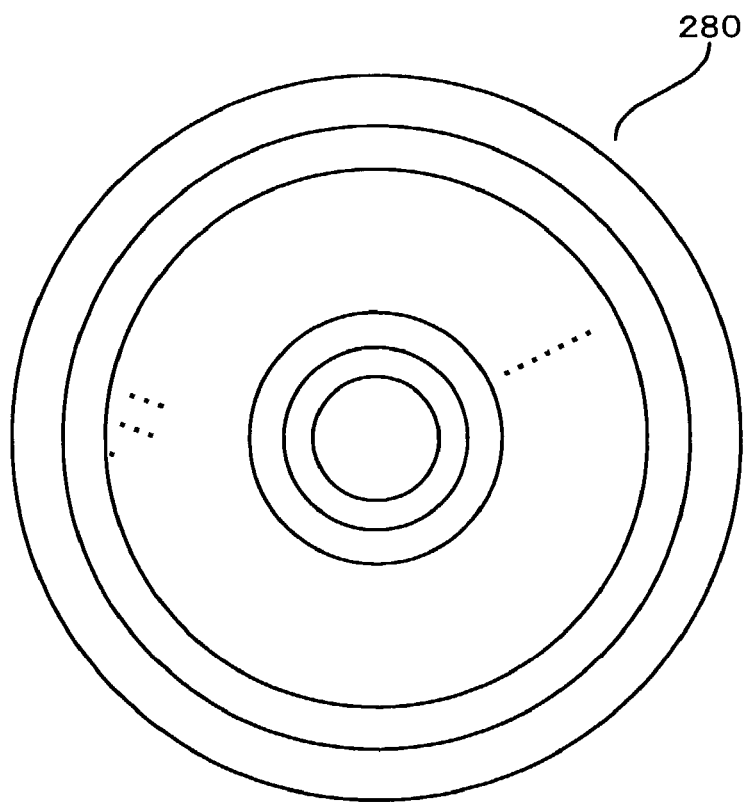
FIG. 29 is a diagram depicting the magnetic disk.

FIG. 26 is a diagram depicting the operation of the third embodiment, which is limited to the case of a device where Factory Format continues for a plurality of tracks until the final track of the device, and in this case, the transfer efficiency further improves compared with the first and second embodiments.

As described above, the primary RA writes information on the Factory Format Track (that is, information that this is Factory Format, and the range of the Factory Format Track (start CCHH, end CCHH)) in the RA Header, so a remote magnetic disk control apparatus, where the secondary RA can create a Factory Format Track in this track of the secondary center disk, can be implemented.

When the Factory Format Tracks exist discretely on a plurality of tracks, the primary RA picks up the Factory Format Tracks, and writes information on all the Factory Format Tracks in the RA Header, so a remote magnetic disk control apparatus, where the secondary RA can create a plurality of Factory Format Tracks by one remote transfer processing, can be implemented.

When all the continuous tracks, from the end of the user data to the end of the device, are Factory Format Tracks, the information that all the tracks from the end of the user data to the end of the device are Factory Format Tracks is written in the RA Header of the remote transfer packet, so a remote magnetic disk control apparatus where the secondary RA can create Factory Format Tracks voluntarily can be implemented.

Other Embodiments

In the above embodiments, the disk was described as a magnetic disk, but the present invention can be applied to optical disks and magneto-optical disks as well. Also the CKD format was used in the above description, but the present invention can be applied to other track formats.

The present invention was described by the embodiments, but various modifications are possible within the scope of the essential characteristics of the present invention, and these shall not be excluded from the technical scope of the present invention.

INDUSTRIAL APPLICABILITY

The Factory Format is implemented by the factory shipment format flag in the TFT 20, and not by a conventional method involving accessing a magnetic disk, so Factory Format can be executed with about $1/100$ processing time compared with a conventional method, which dramatically decreases the processing time and decreases cost accordingly.

Also in the present invention, the factory shipment format, which is comprised of arbitrary data patterns, can be registered in the FFLT 22, so it is easy to change to an arbitrary factory shipment format at the user location in a short time.

The invention claimed is:

1. A disk control apparatus for performing input/output control of data of a storage disk device according to an input/output request from a host, comprising:

a cache memory which stores a part of the data of said storage disk device;

a management table which has format information for indicating whether a track of said storage disk device has been initialized to a predetermined track format for each track of said storage disk device, said predetermined track format including at least a track position and an attribute of user area of the track; and a control unit which creates track format information of said predetermined track format referring to said management table when an input/output request is received from said host, wherein said control unit, when a write request is received from said host, stores write data into said cache memory, judges whether a target track for said write data has been initialized to said predetermined track format by referring to said management table, writes directly said write data and said track format information on said target track itself, where there is not written any track format, of said storage disk device when judging that the target track has not been initialized, and updates said format information of said target track in said management table to complete initialization of said target track.

2. The disk control apparatus according to claim 1, wherein said control unit sets a flag to indicate whether initialization is completed in said management table according to an instruction from the outside, and performs the track format initialization of the track of said storage disk device according to said flag in said management table.

3. The disk control apparatus according to claim 1, wherein said control unit judges whether a second target track for a read request has been initialized to said predetermined track format by referring to said management table, creates said track format information when judging that the second target track has not been initialized, and responds to said host, when said read request is received from said host.

4. The disk control apparatus according to claim 1, wherein said disk control device further comprises a list table for storing a plurality of track format patterns, and said control unit creates the track format information specified by said list table referring to said management table, when an input/output request is received from said host.

5. The disk control device according to claim 1, wherein said control unit judges whether or not the target record of said write request is HA/R0 (Home Address/Record 0), and creates and writes HA/standard R0 data in the cache memory when judging that the target record is not the HA/R0.

6. A disk control method for controlling input/output of data of a storage disk device according to an input/output request from a host, comprising:

an initialization step of setting format information which indicates whether a track of said storage disk device has been initialized to a predetermined track format for each track of said storage disk device in a management table, said predetermined track format including at least a track position and an attribute of user area of the track; and an input/output control step of creating track format information of said predetermined track format referring to said management table when an input/output request is received from said host, wherein, said control step comprises the steps of:

storing, when a write request is received from said host, write data into said cache memory;

judging whether a target track for said write data has been initialized to said predetermined track format by referring to said management table;

writing directly said write data and said track format information on said target track itself, where there is not written any track format, of said storage disk device when judging that the target track has not been initialized; and updating said format information of said target track in said management table to complete initialization of said target track.

7. The disk control method according to claim 6, wherein said initialization step comprises the steps of:

setting a flag to indicate whether said initialization has been completed in said management table according to an instruction from the outside; and starting the track formatting initialization of a track of said storage disk device.

8. The disk control method according to claim 6, wherein said control step comprises the steps of:

judging whether a second target track for a read request has been initialized to said predetermined track format by referring to said management table when said read request is received from said host;

creating said track format information when judging that the second target track has not been initialized; and responding to said host.

9. The disk control method according to claim 6, further comprising a step of storing a plurality of track format patterns in a list table, wherein said control step comprises a step of creating a track format information specified by said list table referring to said management table when an input/output request is received from said host.

10. The disk control method according to claim 6, further comprising the steps of: judging whether or not the target record of said write request is HA/R0 (Home address/Record 0); and creating and writing HA/standard R0 data in the cache memory when judging that the target record is not the HA/R0.

* * * * *